3,299,010
PRESSURE SENSITIVE ADHESIVE POLYMERS
AND TAPES THEREFROM
Carlos M. Samour, Wellesley Hills, Mass., assignor to
The Kendall Company, Boston, Mass., a corporation
of Massachusetts
No Drawing. Filed July 21, 1964, Ser. No. 386,476
45 Claims. (Cl. 260—78)

This case is a continuation-in-part of each of the following co-pending patent applications: Serial No. 235,517, filed November 6, 1962; Serial No. 282,843, filed May 24, 1963; and Serial No. 329,362, filed December 10, 1963.

This invention relates to polymers and to monomeric compositions corresponding to recurring units therein, said polymers containing recurring units corresponding to molecules of acrylate and/or methacrylate monomers and recurring units corresponding to molecules of one or more of the following monomers: N-alkyl substituted amido derivatives of monoethylenically unsaturated mono- and di-carboxylic acids, N-alkyl substituted amino salts of said monocarboxylic acids, and half-esters of said dicarboxylic acids. In particular, this invention relates to pressure-sensitive adhesive polymers containing such recurring units and flexible sheet material coated with such polymers, including pressure-sensitive adhesive tape.

Amido derivatives of said acids (or anhydrides, in the case of the dicarboxylic acids) are those wherein a nitrogen atom is attached to the carbon atom of a carboxylic acid group (—COOH) in place of the —OH group thereon according to the following structural unit

and includes amides, amic acids, diamides, imides and ester-amides of said acids. Amino salts of said monocarboxylic acids are those containing the structural unit

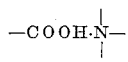

Half-esters are those esters of dicarboxylic acids in which only one of the carboxylic acid groups of the acid is esterified and the other is in its free acid form.

A long sought for objective of the pressure-sensitive adhesive tape industry has been the simplification of adhesive masses from multi-component recipes to less complex formulas, ideally containing a single ingredient which per se functions as a pressure-sensitive adhesive. The motivation for this objective is readily apparent in view of the complexity of the adhesive masses employed in the majority of tapes now on the market and most certainly is readily appreciated by those having experience in supply, quality control and processing problems in the manufacture of multi-component products. The ideal objective of a single ingredient pressure-sensitive adhesive (exclusive of other materials which may be added thereto for reasons incidental to or to implement its inherent adhesive properties) may indeed seem unattainable to the formulator of conventional multi-component pressure-sensitive adhesives. Pressure-sensitive adhesives are characterized by essentially three properties: tack, adhesion and cohesion. These properties are generally interdependent, for steps or means used to influence one can cause a change in one or more of the other properties, oftentimes at a sacrifice thereto.

Among the materials which received early attention as a possible single-component pressure-sensitive adhesive were the homopolymers of alkyl esters of acrylic acid. Acrylate homopolymers, as was known, exhibit properties of varying degrees of softness or hardness and tackiness, depending largely upon the type of alcohol or mixtures of alcohols from which the esters are prepared. Briefly, it was known that as the number of carbon atoms of the straight chain alkyl group of the alcohol increases, the homopolymers progress from tough, rubbery and moderately hard polymers, to soft, less tough and more rubbery polymers, to soft, tacky polymers, to hard, brittle and waxlike polymers. The homopolymer of the n-butyl acrylate monomer is soft and tacky and the trend to softer, tacky polymers continues until the n-alkyl group of the ester contains about 8 carbon atoms. Thereafter, the trend is to hard, brittle, crystalline and waxlike polymers derived from n-alkyl acrylates, such as n-hexadecyl acrylate and n-octadecyl acrylate. Polymer molecular weight also influences the properties of rubberyness, tackiness, softness, toughness, hardness and brittleness. Acrylates which by themselves are known to form solid, tacky-soft polymers are esters of acrylic acid and primary and secondary alkyl alcohols containing from 4 to about 12 carbon atoms. Esters of acrylic acid and tertiary-alkyl alcohols, such as t-butyl alcohol and t-amyl alcohol homopolymerize into relatively hard and tack free polymers. Polymethacrylates exhibit a similar trend in properties but, generally are free of appreciable tack and are more rubbery, more rigid and tougher than the corresponding polyacrylates.

The acrylate homopolymers proposed in the prior art as adhesives have been limited to polymers of esters of acrylic acid and non-tertiary alkyl alcohols wherein the alkyl groups contain an average of from 4 to 12 carbon atoms, and moreover, wherein the main chains thereof contain 50% or more of the carbon atoms in the alkyl groups. However, these homopolymers are said to be deficient in either aggressive tackiness or, if aggressively tacky, deficient in cohesive strength. Proposals have been made to overcome the deficiencies of homoacrylate adhesive polymers by copolymerizing minor amounts of various other monomers with the acrylates. These other monomers include divinyl monomers, diesters of fumaric acid and polar comonomers such as acrylic acid. Ordinarily, these other monomers are present in the polymer as additive monomers and not as principal monomers. Thus, examples in the prior art show that about 1% by weight of diallyl succinate or up to about 25% by weight of $C_4$ to $C_6$ dialkyl fumarates may be copolymerized with alkyl acrylates containing up to about 6 carbon atoms in the alkyl groups thereof. Up to about 12% by weight of polar comonomers such as acrylic acid may be copolymerized with alkyl acrylates averaging no more than about 12 carbon atoms in the alkyl groups thereof. Pressure-sensitive adhesive polymers derived from methacrylate monomers or containing appreciable amounts of methacrylates are unknown.

Among the objects of this invention is a class of polymers, particularly pressure-sensitive adhesive polymers and pressure-sensitive adhesive tapes made therfrom. An object of this invention is a pressure-sensitive adhesive tape embodying a pressure-sensitive adhesive polymer containing alkyl acrylate recurring units in which the proportion thereof may vary over a wide range. A further object of this invention is an adhesive tape embodying a pressure-sensitive adhesive polymer containing alkyl acrylates which heretofore have not been employed as the principal or only acrylate. Also included among the objects of this invention are adhesive tapes in which the adhesive is a pressure-sensitive adhesive polymer containing methacrylate recurring units. Further and specific objects of this invention include adhesive tapes in which the adhesive is a pressure-sensitive adhesive polymer containing recurring units corresponding to esters of acrylic and/or methacrylic acids. Another object is to provide an acrylate- or methacrylate-containing pressure-sensitive adhesive polymer having a high proportion of polar groups per recurring acrylate and/or methacrylate units. Other objects will be pointed out hereinafter, such as cross-linked pressure-sensitive adhesive polymers and polymers blended with resins or other materials, and other objects and advantages will become apparent as the description of the invention proceeds.

The adhesive polymer component of this invention are described herein as a "polymer of monomers." It should be understood that this term does not limit the polymers to those which are formed from the stated monomers as starting materials, but includes the same polymers irrespective of the starting monomers. This manner of describing the polymers is chosen merely as a convenient way to describe the composition of the polymer in terms descriptive of the recurring units thereof in their corresponding monomeric form. Accordingly, the polymers may be illustrated as a polymer of monomers consisting essentially of:

(A) at least one monomer selected from the group consisting of monomers the molecules of which have the structure:

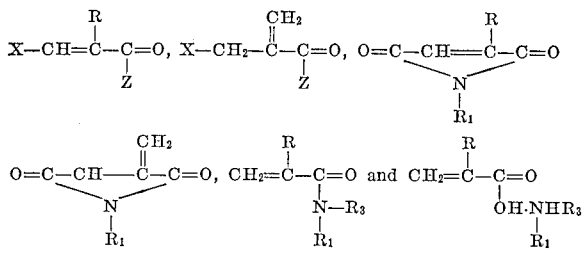

and (B) at least one ester monomer selected from the group consisting of monomers the molecules of which have the structure:

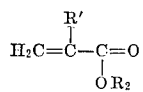

The symbols R and R' may be either hydrogen or methyl. The symbol X may be

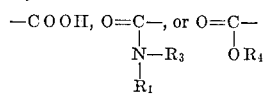

The symbol Z may be either

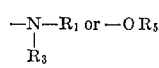

When Z is —$OR_5$ the symbol X is —COOH. The symbols $R_1$, $R_2$, $R_4$ and $R_5$ represent alkyl groups and the $R_3$ symbol represents either hydrogen or alkyl groups. In the following, reference to the (A) or (B) monomers shall mean the monomers set forth in the above (A) and (B) subparagraphs, respectively. These monomers are defined in terms of their constituent molecules and each monomer type in each (A) and (B) class of monomers of course consists of a plurality of molecules. This manner of definition has been adopted since an (A) monomer or a (B) monomer, as the case may be, consisting of one monomer type may consist of identical molecules or a mixture of different molecules of that type. For example, the molecular constituents of a HN—$R_1$-maleamic acid type of monomer(A) may be identical, in which case the $R_1$ substituents thereof are the same, or they may be a mixture of different HN—$R_1$-maleamic acid molecules, differing with respect as to size and configuration of the $R_1$ alkyl groups thereof. Where different as to size, as to configuration, or as to both size and configuration, the maleamic acid type of monomer(A) is a mixture. For the purposes of this application, a "mixture," when such is required, must include monomer molecules with different $R_1$ groups in the case of the amido and the amino salt types of (A) monomers and different $R_5$ groups in the case of the half-ester types of (A) monomers.

Mixtures and branching in the $R_1$ and $R_5$ alkyl groups, as determined by the size of these alkyl groups, are requirements common to each of the amido, amino salt and half-ester type of (A) monomers, as hereinafter described. The mixtures, when required, must contain molecules in which the said alkyl groups are branched. As the average size of these determinative alkyl groups increases, the monomer (A) must consist to an increasing extent of molecules in which the alkyl groups are branched alkyls and to an increasing extent of molecules in which the branched alkyls are different, either as isomers or homologues, or both. The point at which the size of these alkyl groups ($R_1$ and $R_5$) is such to require branching and the point at which the monomer (A) must contain molecules having different alkyl groups and particularly different branched alkyl groups is dependent upon a variety of factors, including the degree of tack and adhesion desired in a pressure-sensitive adhesive polymer and the composition of monomer (B). Preferred polymers of this invention are those in which the determinative alkyl groups ($R_1$ and $R_5$) of the monomer (A) combined in the polymer consist of different branched alkyl groups which, preferably, differ in both size and configuration as in isomers and homologues. The requirement of mixtures of monomer molecules in certain instances in accordance with this invention are not satisfied by compounds with which there are associated other compounds as incidental impurities and which compounds are otherwise considered practically pure.

Another requirement common to all of the monomer types of the (A) monomer class is that the mixtures must be liquids when the average size of the $R_1$ or $R_5$, as the case may be, is greater than about $C_{10}$ in some cases, or about $C_{12}$ in other cases, depending on the specific identity of the molecular components of the mixture. The term "about $C_{10}$" is used in this sense hereafter. The term "liquid" includes viscous, substantially non-crystalline semi-solids. It is well to point out here that the individual monomeric components of the monomer (A) composition need not necessarily satisfy the aforedescribed physical properties. On the contrary, the monomeric components individually may be non-flowing solids, but as mixtures with the other components of the monomer (A) present a composition which is liquid. The suitability of a mixture of molecules of any monomer type of monomer (A) as comonomers in the pressure-sensitive adhesive polymers of this invention may be easily determined by preparing the desired monomer type by amidating, complexing or esterifying the appropriate acid with a mixture of alkyl amines or alcohols. If the reaction product is a solid, a more complex mixture is indicated. The complexity of the mixture may be increased by increasing the number of molecules having alkyl groups of different sizes, by increasing the extent of branching in the alkyl groups, or by increasing the extent to which the alkyl groups thereof differ from each other in size and configuration. To accomplish this, the complexity of the given amine or alcohol mixture can be increased by the addition or by the substitution of branched alkyl amines or alcohols in the mixture, differing from the amines or alcohols of the original mixture either as to size or configuration of the alkyl groups or, preferably, differing both in size and configuration. The size of the alkyl groups of the amines or alcohols may be chosen to maintain the average size of the alkyl groups the same as the original mixture. The liquid nature of the reaction product derived from the mixture of amines or alcohols is a sufficient indication of its suitability as a monomer (A) composition. These liquid monomer (A) compositions permit a wider choice of monomer (B) compositions and a wider range of proportions of monomers (A) and (B) in the pressure-sensitive adhesive polymers of this invention having a probe tack value of at least 100 grams, as determined by the test hereinafter described.

The term "size" in reference to any alkyl group as used herein refers to the number of carbon atoms in the alkyl group and the term "average size" refers to the average number of carbon atoms in all the alkyl radicals of any one "R" class ($R_1$, $R_2$, $R_3$ etc.) whether the configuration of the alkyl radicals are the same or different.

The extent of branching in the branched alkyl substituents of the polymers of this invention is proportional to the average number of groupings of non-branching carbon atoms therein and inversely proportional to the number of consecutive non-branching carbon atoms in such groupings. The term "grouping" includes a single non-branching carbon atom (not directly connected to another non-branching carbon atom) as well as two or more consecutive non-branching carbon atoms connected to each other. The term "non-branching carbon atoms" means the carbon atoms that have no more than two carbons directly linked thereto. A "branching carbon atom" is a carbon atom that is directly attached to more than two carbon atoms. The carbon atom directly attached to the amido nitrogen atom in the case of the amido monomers or to the carboxylic oxygen atom in the case of the ester monomers is a branching carbon atom. The possible number of branching carbon atoms and hence the possible number of branches are, of course, a function of the number of carbon atoms in the alkyl group. Thus, greater extent of branching is obtained not merely by an increase in the number of branches, as side chains, on the main chains of the alkyl groups, but by branching in the side chains also. A minimum extent of branching generally applicable to those alkyl groups required to be branched is that in which the alkyl groups have a minimum of at least two branching carbon atoms and a maximum of one group of from 5 to 6 consecutive non-branching carbon atoms.

The effect of branding in producing the above-stated tack level is further improved as the extent of mixing of monomer molecules having different alkyl groups increases. The effectiveness of mixing increases as the number of different alkyl groups in the mixture increases, and is particularly enhanced when the alkyl substituents differ from each other as isomers and not merely as homologues. The extent of mixing is greater in the case of a mixture containing equal amounts of three different molecules of the same monomer type than it is in the case of a mixture containing equal amounts of two different molecules of the same type monomer, and is also greater than it is in the case of a mixture containing unequal amounts of three different molecules. The terms "non-conformability" or "complexity" as used herein mean the total effect of branching and mixing.

The properties of the polymers are determined by an interdependency of factors including: the proportions of the monomer (A) and monomer (B) combined in the polymer; the type or types of monomers of these (A) and (B) classes of monomers combined therein; the number of carbon atoms in their respective alkyl groups; the configurations of the alkyl groups; and the extent to which the monomer (A), primarily, and monomer (B) to a lesser extent, consist of mixtures of molecules having different alkyl groups. With due regard to the interdependency of these factors, certain generalization as to proportions, by weight, of the (A) and (B) monomers combined in the pressure-sensitive adhesive polymers of this invention will be helpful as further introduction to the specific examples set forth hereafter. In all of the pressure-sensitive adhesive polymers the maximum amount of the (A) monomer combined with the (B) monomer does not exceed a monomer(A):monomer(B) mol ratio of about 1:1. The range of proportions generally applicable to the various types of (A) and (B) monomers are tabulated below.

| Monomer(A) | Monomer(B) | Proportion, by wt. |
|---|---|---|
| Amido (dicarboxylic acid) | Acrylate | 1:19–7:3 |
| Do | Methacrylate | 1:19–3:2 |
| Acrylamide or amino salt | Acrylate | 1:19–3:1 |
| Do | Methacrylate | 1:9–3:2 |
| Methacrylamide or amino salt | Acrylate | 1:19–3:1 |
| Do | Methacrylate | 1:9–1:1 |
| Half-ester | Acrylate | 1:19–7:3 |
| Do | Methacrylate | 1:19–3:2 |

These proportions are for pressure-sensitive polymers in which the (A) and (B) monomers each are composed of single types of monomers. Polymers in which either the (A) or the (B) monomer are mixtures of one or more of the specified types are encompassed by this invention. In the case of such mixtures the above ranges of proportion may or may not be affected, depending upon the monomer types and relative amounts composing such mixtures. This may be illustrated with a monomer(A):methacrylate monomer(B) polymer. If (A) is all methacrylamide, the maximum weight ratio is about 1:1. The maximum weight ratio of (A) to (B) may be greater than about 1:1 if the monomer(A) is composed of a mixture of amic acid and methacrylamide types of monomers, and may be as high as 3:2. This can be obtained if the amic acid monomer is a complex mixture of amic acid molecules which, as the sole monomer(A) type of monomer, can be copolymerized with the given methacrylate(B) monomer in a 3:2 weight ratio to produce a pressure-sensitive adhesive polymer. Also, as will be shown, the range of proportions for each type of monomer(A):monomer(B) combination varies within the scope of each stated range, depending upon the non-conformability of the alkyl groups thereof and the complexity of the (A) and (B) monomers. One skilled in the art following the teachings herein set forth will be able to select compositions of monomers(A) and (B) and proportions thereof within the general ranges above set forth and particular ranges specified below to produce pressure-sensitive adhesive polymers of this invention. Recognizing that the mode and conditions of polymerization may influence the properties of the polymers, one experienced in the practice of this invention will be able to select the (A) and (B) monomers and proportions thereof to yield polymers having optimum pressure-sensitive adhesive properties for the intended use thereof.

Bearing the foregoing in mind, the sizes and structures of $R_1$, $R_2$, $R_3$ and $R_4$ of the N-alkyl monomer(A):monomer(B) polymers now may be defined with some particularity. For further specifics as to size, structure and complexity, reference should be made to the specific monomer types in the following sections of the disclosure. For the sake of continuity in the disclosure the $R_5$ groups are described in that section specifically directed to the half-ester monomer(A):monomer(B) polymers.

The $R_1$ groups are alkyl groups containing from 1 to about 28 carbon atoms, the average number of carbon atoms thereof being no greater than about 24. These monomer(A) molecules having $R_1$ groups containing more than 28 carbon atoms may be present in small amounts, particularly if the $R_1$ groups are branched alkyl groups and the monomer(A) consists of a mixture of a large number of molecules having widely different $R_1$ alkyl groups. The $R_1$ groups of the monomer(A) molecule mixtures may exceed an average of 24 carbon atoms. However, then the number of different $R_1$-substituted molecules and the extent of branching in the $R_1$ groups, particularly as the size of the $R_1$ groups increases, should be increased.

The smaller size $R_1$ alkyl groups may be either straight or branched chain alkyl groups. The larger size $R_1$ alkyl groups must consist essentially of branched alkyl groups said alkyl groups increasing in extent of branching as the size thereof increases. Branching is generally required in the case of $R_1$ alkyl groups containing more than about 6 carbon atoms. As the size of the $R_1$ alkyl groups increases the monomer(A) molecules must consist to an increasing extent of mixtures wherein the $R_1$ alkyls are different, either as isomers or homologues, or preferably both. Mixtures are generally required in the case of monomer(A) molecules containing more than about 10 carbon atoms in their respective $R_1$ alkyl groups. The point at which the size of the $R_1$ groups is such to require branching and the point at which these monomer(A) molecules must contain molecules having different $R_1$ alkyl groups is dependent upon a number of factors, including the specific type of monomer(A), the degree of tack and adhesion desired in the pressure-sensitive adhesive polymer and the type and composition of the monomer(B). These numerical limitations placed upon the number of carbon atoms of $R_1$ to designate the point at which branched alkyl $R_1$ groups and, furthermore, different alkyl groups must be present are limitations which are applicable to produce pressure-sensitive adhesive polymers having the tackiness as stated above. These limitations will be correlated with monomer(B) compositions and proportions yielding pressure-sensitive adhesive polymers. As will appear from an over-all consideration of the invention, the limitations are approximate from which some deviations are possible and still obtain the pressure-sensitive adhesive polymer objectives of this invention.

The $R_2$ groups are alkyl groups containing from 1 to about 14 carbon atoms. The size of the alkyl groups depends upon whether the (B) monomer is an acrylate monomer, methacrylate monomer, or mixtures thereof. Generally, the minimum number of carbon atoms permissible in the $R_2$ groups in the case of the acrylate type of monomer(A) is less than in the case of the methacrylate monomer(B). The average minimum and maximum sizes of $R_2$ also depends upon the complexity of the monomer(A) composition, determined, for example, by the average size of $R_1$, extent of branching in $R_1$, the extent to which monomer(A) is a mixture of molecules containing different $R_1$ alkyl groups, and whether monomer(A) is all the same type of monomer or a mixture of monomer types. The $R_2$ groups may be either straight chain or branched alkyl groups, or mixtures. Preferably, the $R_2$ alkyl groups contraining more than about 9 carbon atoms are branched alkyl groups. Mixtures of acrylate monomer(B) molecules, particularly when the $R_2$ alkyl groups are the higher alkyl groups in which branching is preferred, offer wider latitude in the composition of monomer(A) and in the proportions thereof. At least 50% of the acrylate molecules of the monomer(A) component should be non-tertiary alkyl acrylates. All methacrylate molecules are non-tertiary alkyl methacrylates. Minor amounts of acrylates or methacrylates containing $R_2$ groups greater than 14 carbon atoms may be present in the monomer(B) composition, greater latitude in this respect being permitted with the more complex monomer(B) mixture.

The $R_3$ alkyl groups contain from 1 to about 10 carbon atoms. The $R_3$ alkyl groups containing from about 6 to 10 carbon atoms arre branched alkyl groups, although branching in every $R_3$ alkyl group of these secondary N-substituted monomer(A) is not essential. Generally, the extent of branching in the $R_3$ groups need not be as great as in $R_1$ for liquid or substantially non-crystalline monomer(A) compositions. For purposes of this application, the larger size alkyl group on the nitrogen atom shall be deemed the $R_1$ group.

The ester-amide monomer molecules are molecules in which the $R_4$ alkyl groups contain up to about 18 carbon atoms, the alkyl groups containing more than about 8 carbon atoms consisting essentially of branched alkyl groups.

1. AMIDO(DICARBOXYLIC)MONOMER(A):
MONOMER(B)POLYMERS (a) *Amido(dicarboxylic)monomer(A)*. — These amido-type monomers are the N-alkyl substituted amic acids, diamides, amide-esters and imides of monoethylenically unsaturated dicarboxylic acids such as maleic, fumaric, citraconic and itaconic acids, represented by the structures

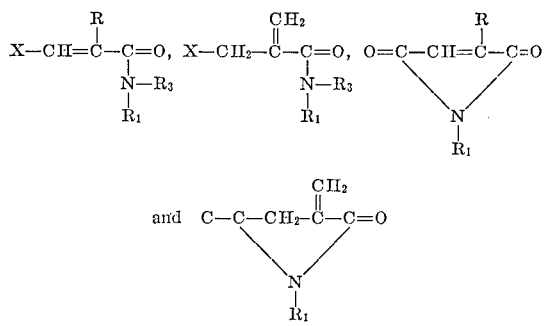

When the $R_1$ alkyl groups of the monomer molecules contain less than about 11 carbon atoms, the monomer(A) composition may be either a liquid or a crystalline solid in its monomeric form. The $R_1$ alkyl groups containing more than about 6 carbon atoms should be substantially all branched when the $R_1$ alkyl groups are all the same size within the range of $C_7$ to about $C_9$-$C_{10}$ alkyls, in the case of N-mono-alkyl substituted amic acids and diamides. In the case of imide monomer(A) and ester-amide monomer(A), the $R_1$ alkyl groups of the molecules may contain about 8 to 10 carbon atoms before any appreciable branching is necessary.

When the average size of $R_1$ is greater than about $C_{10}$, depending upon monomer(A), the monomeric form of the monomer(A) composition must be a liquid to a substantially non-crystalline, viscous semi-solid, soluble in the monomer(B) component. These physical property requirements are satisfied, as the average size of $R_1$ increases above about 10 carbon atoms, as the extent of branching of $R_1$ increases and as the extent of mixing of molecules having different branched $R_1$ groups increases in monomer(A). Specific illustrations follow, N-t-butyl maleamic acid is a water soluble crystalline solid. The maleamic acid of N-t-1,1,3,3-tetramethyl butyl amine is also a water soluble crystalline solid. A "N-t-nonyl" maleamic acid prepared by amidating maleic anhydride with a mixture of highly branched t-alkyl primary amines consisting principally of N-t-$C_9$ and N-t-$C_{10}$ branched alkyl amines is a partially crystalline solid, generally soluble in the monomer(B) component. The N-t-nonyl maleamic acid monomer is less crystalline than the t-octyl maleamic acid monomer, even though the average size of the alkyl groups thereof is greater than the size of the t-octyl group. The effect of mixtures of alkyl groups, particularly branched alkyl groups, as the number of carbon atoms increases above 10 is further illustrated by a mixture of "N-t-$C_{12}$ branched alkyl" maleamic acids. This monomer(A) is a complex mixture of maleamic acid molecules in which the $R_1$ consist of a large number of highly branched alkyl groups, principally t-$C_{11}$ to t-$C_{14}$ alkyl groups, averagiang about t-$C_{12}$, as described in detail below. This N-t-$C_{12}$ maleamic acid is a highly viscous liquid. In contrast, a "N-straight chain $C_{14}$" maleamic acid prepared from maleic anhydride and a mixture of straight chain alkyl fatty amines containing from 10 to 18 carbon atoms and averaging 14 carbon atoms was insoluble and crystalline. A progressive substitution of a branched alkyl amine containing the same number of carbon atoms as in the replaced fatty amine in the mixture produces maleamic acid mixtures gradually increasing in solubility and decreasing in crystallinity. A concurrent increase in extent of branching in the branched alkyl amines promotes the increase in solubility and decrease in crystallinity.

Monomer(A) compositions for pressure-sensitive adhesive polymers having a probe tack value of at least about 100 grams, determined as hereinafter described, are compositions varying from a crystalline solid to a liquid, varying in solubility from soluble in water to soluble in the monomer(B) composition with which monomer(A) is combined in the polymer. The monomer(A) compositions are soluble to a sufficient extent to permit practical emulsion polymerization. In general, the less crystalline the monomer(A) component in any given system, the higher will be the tack of the polymer produced.

The effect of branching in producing the above stated tack level is further improved as the extent of mixing of monomer molecules having different $R_1$ groups increases. When such $R_1$ groups are different, all straight chain alkyl groups, there is little beneficial effect in mixing, even when in the case of the longer chain alkyl groups (i.e., above 6 to 8 carbon atoms), the straight chain alkyl groups in the mixture are not adjacent homologues. Adjacent homologues are those that differ from each other by one methylene group. The beneficial effect, however, is enhanced by mixing molecules containing different branched alkyl groups, even when the branched alkyl groups are adjacent homologues. This has been illustrated above with the t-octyl, t-nonyl, t-$C_{12}$ and $C_{14}$ amic acid monomers. As a comparison of the t-nonyl mixture of monomers and the t-$C_{12}$ mixture shows, the effectiveness of mixing increases as the number of different ingredients in the mixture increases.

$R_1$, $R_3$ and $R_4$ (in the case of the ester-amide) are interrelated with respect to size and to the degree of branching and extent of mixing of the molecules. The greater the contribution to the complexity of the system provided by any one of these R groups, the less is the contribution required from the other R groups. Preferably, as the size of $R_1$ or $R_4$ increases from 10 carbon atoms to the maximum size permissible, the outer R group should decrease in size from its maximum.

The preferred monomer(A) compositions for pressure-sensitive adhesive polymers are those which in their monomeric state are soluble liquid to viscous semi-solid mixtures of molecules having different highly branched $R_1$ groups containing up to about 28 carbon atoms in which the average number of carbon atoms of $R_1$ in the mixture is from about 8 to 24 and the mixture consists principally of alkyl groups having a number of carbon atoms within the average range. Among the mixtures of alkyl amines containing these alkyl groups which may be employed as starting materials in producing said monomer(A) compositions are Primene 81-R and primene JM-T, marketed by the Rohm and Haas Company. The amines of these mixtures are reported to be t-alkyl primary amines having highly branched alkyl groups in which the primary amino nitrogen is directly attached to a tertiary carbon atom so that they contain the structural element.

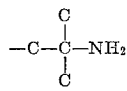

These mixtures are composed principally of amines having alkyl groups in the 11 to 22 carbon atom range. Primene 81-R consists principally of $C_{11}$ to $C_{14}$ alkyl amines. Primene JM-T consists principally of $C_{18}$ to $C_{22}$ alkyl amines. Vacuum fractional distillation and the neutral equivalents of the various fractions show that Primene 81-R mixture is composed of about 90% alkyl amines averaging 11 to 14 carbon atoms. Vacuum straight-lead distillation and the neutral equivalents of the various fractions show that the JM-T mixture is composed of about 80% alkyl amines averaging 18 to 21 carbon atoms, 15% averaging greater than 22 carbon atoms and 5% averaging less than 10 carbon atoms. The neutral equivalent of the Primene 81-R mixture of amines is reported to be 191, corresponding to a tertiary alkyl amine having an average of about 12 carbon atoms. The neutral equivalent of the Primene JM-T mixture of amines is reported to be 315, corresponding to an alkyl amine having an average of about 21 carbon atoms. The molecular weight of the Primene JM-T mixture is principally 269-325.

It is reported that these mixtures include such t-alkyl amines as t-butyl amine; 1,1,3,3-tetramethyl-butyl amine; 1,1,3,3,5,5-hexamethylhexyl amine; 1,1,3,3,5,5,7,7-octamethyloctyl amine; 1,1,3,3,5,5,7,7,9,9-decamethyldecyl amine; and 1,1,3,3,5,5,7,7,9,9,11,11-decamethyldodecyl amine.

Another suitable mixture of N-t-alkyl amines is a mixture which has been marketed as t-nonyl amine by the supplier of the Primene materials. This mixture consists principally of highly branched N-t-$C_9H_{19}$ and N-t-$C_{10}H_{21}$ amines. The neutral equivalent of this mixture is reported as 142, corresponding to an alkyl amine having an average of about 9 carbon atoms. The molecular weight of this mixture is principally 143-157.

(b) *Acrylate monomer(B)*.—Generally, the number of carbon atoms in $R_2$ of the acrylate monomer may average from about 3 to 13 when monomer(A) is an amido derivative of dicarboxylic acids and $R_1$ is a lower alkyl containing not more than about 6 carbon atoms. As the average size of $R_1$ increases within the 7 to 10 carbon atom range and the extent of branching increases, $R_2$ may average from 2 to 13 carbon atoms. As the average size of $R_1$ increases to within the 11 to 24 carbon atom range and the extent of branching and mixing therein increases (ideally to the extent that the mixture of monomer(A) molecules is a liquid to viscous semi-solid, soluble as aforedescribed), $R_2$ may average from 1 to about 13 carbon atoms. Minor amounts of acrylate esters containing $R_2$ groups greater than 14 carbon atoms may be present in the monomer(B) composition, greater latitude in this respect being permitted with the more complex monomer(B) mixtures.

Within the range of proportions of 1:19 to 7:3 for the amido(dicarboxylic)monomer(A):acrylate monomer (B) pressure-sensitive adhesive polymers having the stated tackiness, the proportions range from 1:19 to about 1:2 when $R_1$ averages from 1 to about 6 and in which case $R_2$ averages from about 3 to 13. The approximate maximum within this range, when $R_1$ consists of all the same (i.e. unmixed) alkyl groups and $R_2$ consists of all the same alkyl groups or a mixture of different alkyl groups, is 1:3. This maximum is reached when $R_2$ contains about 8 carbon atoms. The maximum proportion gradually decreases as the number of carbon atoms in $R_2$ decreases from 8 to 3 and increases from about 8 to 13. When monomer(A) is a derivative of a dicarboxylic acid, the (A) and (B) monomers may be combined in the polymer in the maximum ratio of 1:2 when monomer(A) consists of a mixture of molecules having different $C_1$ to $C_6$ alkyl groups and the $R_2$ of the acrylate monomer(B) consists of either all the same alkyl groups or a mixture having different $C_1$ to $C_{14}$ alkyl groups averaging from 3 to 13 carbon atoms. This maximum is gradually approached as the average number of carbon atoms in $R_2$ increases from 3 and is reached at about 8.

These factors of composition and proportions for amic acid monomer(A):monomer(B) compositions are summarized in the first group of Table I.

The relationship between monomer(A) and monomer (B) compositions and proportions is set forth in Table I as a general guide in the understanding of the invention. It is emphasized that the data is Table I is to be interpreted in context with the entire disclosure of the invention and is not to be taken as a completely self-contained statement of the invention in the polymers of this section of the disclosure.

TABLE I
[Amic acid monomer(A):acrylate monomer(B)]

| No. Carbon Atoms in $R_1$ and Complexity | No. Carbon Atoms in $R_2$ | Weight Proportion (A):(B) |
|---|---|---|
| (1) 1-6 | 3-13 | 1:19-1:2 |
| (a) Unmixed | 3-13 | 1:19-1:3 |
| (b) Mixed | 3-13 | 1:19-1:2 |
| (2) 7-10 branched | 2-13 | 1:19-2:3 |
| (a) Unmixed | 2-13 | 1:19-1:3 |
| (b) Mixed | 2-13 | 1:19-2:3 |
| (3) 1-10 mixed (7-10 branched) | 2-13 | 1:19-2:3 |
| (4) Mixed, average below 11 containing some below $C_7$ and some above $C_{10}$ being branched and mixed | 2-13 | 1:19-1:1 |
| (5) 1-28 mixed, average 11-24, essentially all above $C_{10}$, 7-28 branched | 1-13 | 1:19-7:3 |
| (a) Same as above | 1-2 | 1:4-7:3 |

As shown in the second group in Table I, the maximum proportion of amic acid monomer(A) in the polymer can be increased to about 2:3 as the average number of carbon atoms in the $R_1$ groups increases from 1-6 to 7-10 and as the alkyl groups are branched. Also, a greater range of alkyl acrylates may be employed in the monomer(B) composition. The maximum should not exceed about 1:3 when substantially all of the $R_1$ groups are the same.

Mixing of the lower $C_1$ to $C_6$ alkyl groups with branched $C_7$ to $C_{10}$ alkyl groups, when monomer(A) is a derivative of a dicarboxylic acid, in amounts such that the average size of $R_1$ is still within the 7 to 10 carbon atom range, has no appreciable beneficial effect upon increasing the range of the proportions. On the other hand, adding branched $C_7$-$C_{10}$ alkyls, particularly different branched $C_7$-$C_{10}$ alkyls, to the lower $C_1$ to $C_6$ alkyl groups permits a gradual increase in the maximum proportion of monomer(A) in the polymer as the addition causes a gradual increase in the average number of carbon atoms of the alkyl groups. Thus, the maximum of 2:3 of the third group in Table I is reached as the $R_1$ groups of monomer(A) consist of an increasing number of branched $C_7$-$C_{10}$ N-substituted monomer(A) molecules. As the average number of these molecules decreases and the number of $C_1$-$C_6$ N-substituted monomer(A) molecules proportionally increases, the proportion range decreases to that in the second and first groups of Table I.

The effect on the breadth of the proportion range of increased branching and increased extent of mixing is indicated in the fourth group of the table. For a monomer(A) composition having an average $R_1$ of less than 11 carbon atoms, increasing the extent of mixing therein with alkyl groups containing more than 10 carbon atoms and particularly with mixtures of increasingly branched alkyl groups raises the maximum proportion of monomer(A) to about one part by weight for every one part by weight of acrylate monomer(B).

The effect of increased branching and extent of mixing, as the average number of carbon atoms in $R_1$ increases, upon proportions and the acrylate monomer(B) composition is further illustrated in the fifth group of Table I. The maximum proportion, as stated previously, does not exceed a mol ratio of 1:1 of monomer(A) to monomer(B). As generally shown in the five groups of the table, the average number of carbon atoms of $R_2$ may decrease as the average number of carbon atoms and the complexity of the $R_1$ alkyl groups increase. The minimum amount of monomer(A) in the pressure-sensitive adhesive polymers is greater than 1:19 when $R_2$ averages 1-2 carbon atoms, the amount increasing as the average number of carbon atoms and complexity of the $R_1$ alkyl groups decrease.

The proportions set forth in Table I are those for amic acid monomer(A):acrylate monomer(B) pressure-sensitive adhesive polymers. The proportions and the considerations as to the extent of mixing, extent of branching and increasing size of the alkyl substituents are generally applicable for the other amido(dicarboxylic monomer(A) types combined with acrylate monomer(B)).

(c) *Methacrylate monomer(B)*.—The average number of carbon atoms in the $R_2$ groups of the methacrylate monomer(B) molecules may range from 4 to 14, depending upon the complexity of monomer(A).

Table II is analogous to Table I, setting forth a condensation of approximate relationships between the monomer(A) composition, methacrylate monomer(B) composition and proportions. Table II shows that the minimum number of carbon atoms in $R_2$ decreases from about 8 to about 4 as the complexity of the monomer(A) composition increases with increasingly greater number of carbon atoms in $R_1$ within the range aforedescribed. The minimum proportion in which monomer(A) can be combined with methacrylate monomer(B) decreases and the maximum proportion increases as the average size of $R_1$ increases and the complexity of the monomer(A) composition increases. Within each proportion range the proportion of monomer(A) increases to the maximum of the range as the average sizes of $R_1$ and $R_2$ increase and the complexity of the composition of monomer(A) and (B) increase. Preferably the mol ratio of monomer(A) to methacrylate monomer(B) should not exceed 1:2 for these pressure-sensitive adhesive polymers. The greatest latitude in composition of methacrylate monomer(B) and proportions of (A) to (B) is obtained with the highly complex monomer(A) compositions, particularly those which are the liquid to viscous semi-solid compositions.

TABLE II
[Amic acid monomer (A): Methacrylate monomer (B)]

| No. Carbon Atoms in $R_1$ and complexity | No. Carbon Atoms in $R_2$ | Weight Proportion (A):(B) |
|---|---|---|
| (1) 1-6 | 8-14 | 1:9-1:3 |
| (a) Unmixed | 8-14 | 1:9-1:4 |
| (b) Mixed | 8-14 | 1:9-1:3 |
| (2) 7-10 Branched | 7-14 | 1:9-1:2 |
| (a) Unmixed | 7-14 | 1:9-1:4 |
| (b) Mixed | 7-14 | 1:9-1:3 |
| (3) 1-10 mixed (7-10 branched) | 7-14 | 1:9-1:2 |
| (4) Mixed, average below 11 containing some below $C_7$ and some above $C_{10}$, essentially all above $C_{10}$ | 6-14 | 1:9-2:3 |
| (5) 1-28 mixed, average 11-24 essentially all above $C_{10}$, 7-28 branched | 4-14 | 1:9-3:2 |

The polymers of each of the examples hereafter set forth in this section of this disclosure were prepared by emulsion polymerization employing a redox catalyst system. The catalyst was either potassium persulfate/ sodium bisulfite or hydrogen peroxide/ferrous ammonium sulfate. In some instances ascorbic acid was sometimes employed as part of the hydrogen peroxide/ ferrous ammonium sulfate catalyst system. The amount of catalyst was usually about 1-3% by weight of the monomers. The polymerizations were conducted in a glass reactor suitably equipped with a stirrer, thermometer, condenser and an inlet and outlet for nitrogen gas. The reactor was always flushed with nitrogen and a positive nitrogen pressure was present during polymerization. Heating and cooling of the reaction mixtures, when necessary, were accomplished by means of a water bath. The temperatures of the reaction mixtures during polymerization ranged from about 10° C. to about 80° C. In most cases the starting temperature for polymerization was from about 50–65° C. The hydrogen peroxide catalyzed reactions were initiated at lower starting temperatures, usually about 17–20° C.

The amic acid monomers employed in the examples usually were formed by amidating the anhydride of the dicarboxylic acid in an inert solvent such as benzene. The amic acid monomers were separated from the benzene before adding them to the polymerization reaction mixture. In several instances the amic acid monomers were prepared by adding the amine monomers to the anhydride in the presence of a portion of the acrylate monomer as the solvent. The resulting solution of the amic acid monomers in the acrylate monomer was used in the polymerization reaction without purification to remove unreacted amines and anhydride. While it may be possible to use amino salts of amic acids, such may convert to the amic acid or diamide during the process of manufacturing the polymers and adhesive tapes.

The amounts of the amic acid monomers set forth in the following examples are based on the assumption that all of the amines reacted with all of the anhydride, although this was not always the case. The amidation reaction was sufficiently complete however, for practical purposes insofar as there was no significant difference between a polymer prepared from amic acid monomers containing some unreacted amines and anhydride and a polymer prepared from amic acid monomers purified by a water and hydrochloric acid wash to remove the minor amounts of unreacted compounds. The polymers prepared from the washed amic acids had a higher molecular weight. The amounts of monomers are the amounts added to the polymerization charge, as qualified above, and are not necessarily the exact amounts in which the monomers exist as recurring units in the polymer.

The N-alkyl amido derivatives prepared from the above specified commercial mixture of principally tertiary-$C_{11}$ to tertiary-$C_{14}$ alkyl amines are referred to in the examples as N-t-$C_{12}$ amido derivatives. The derivatives prepared from the above specified commercial mixture of principally tertiary-$C_{18}$ to tertiary-$C_{22}$ alkyl amines are referred to in the examples as N-t-$C_{21}$ derivatives and those prepared from the above specified commercial mixture of principally tertiary-$C_9$ and tertiary-$C_{10}$ alkyl amines are referred to in the examples as N-t-$C_9$ derivatives. The molar proportions of these derivatives are based on the molecular weights of the derivatives of a $C_{12}H_{25}$ amine (neutral equivalent 191), of a $C_{21}H_{43}$ amine (neutral equivalent 315) and of a $C_9H_{19}$ amine (neutral equivalent 142), respectively.

Unless otherwise indicated, the catalyst employed was potassium persulphate/sodium bisulphite; the amounts of this combination of these initiator/reducing compounds are listed accordingly in the examples. In most cases the polymer was coagulated by the addition of aqueous sodium chloride solutions to the polymerization reaction mixtures. In other instances the polymers were coagulated by addition of such compounds as acetic acid or calcium chloride. In most instances the coagulated polymer, after a preliminary water wash, was purified by dissolving the polymer in methyl ethyl ketone (MEK) and precipitated therefrom with water. The precipitated polymer was then further washed with water.

*Example 1*

| Ingredients: | Parts |
|---|---|
| Sodium lauryl sulphate | 5.0 |
| Water | 240.0 |
| N-t-$C_{12}$ maleamic acid | 35.2 |
| Ethyl acrylate | 48.7 |
| n-Butyl acrylate | 15.6 |
| Catalyst | 2.0/0.9 |

An emulsion of these monomers in 200 parts of the water was prepared. Solutions of the initiator and reducing agent each dissolved in 20 parts of water were added to the emulsion. Polymerization was begun at about 53° C. The temperature rose to 62° C. and remained there for about ten minutes. Further addition of catalyst caused no rise in temperature. The polymer was then separated from the emulsion and purified.

The polymer was white and was soluble in toluene, chloroform and MEK. It was insoluble in n-heptane. Intrinsic viscosity: 1.35; Huggin's Constant: 0.521; Brookfield viscosity: 870 cps. (15% in MEK).

This polymer is suitable for use as a pressure-sensitive adhesive. The polymer may be spread from a solution thereof onto conventional backings employed in pressure-sensitive adhesive. The adhesive film of an adhesive tape prepared from this polymer was tacky and exhibited good adhesion to a stainless steel surface. The tape could be removed from the stainless steel surface without rupture or splitting within the adhesive film. Removal of the tape from the stainless steel surface was jerky. Adhesives which are jerky upon removal have been characterized as "harsh" adhesives.

*Example 2*

| Ingredients: | Parts |
|---|---|
| Sodium lauryl sulphate | 6.0 |
| N-t-$C_{12}$ maleamic acid | 57.8 |
| Ethyl acrylate | 20.0 |
| n-Butyl acrylate | 102.4 |
| Catalyst | 1.0/0.6 |
| Water | 350.0 |

The monomers and the soap were added to 300 parts of water with stirring until a good emulsion was obtained. The emulsion was then heated to 51° C. The initiator and reducing agent was added in separately, each in 50 parts of water. The temperature rose to a maximum of 74° C. in about 5 minutes. The polymerization was conducted for a total time of 45 minutes.

Part of the polymer emulsion was coagulated with salt. The separated polymer was washed with water and dried. The polymer was dissolved in MEK, precipitated with water and then water-washed. This purification was repeated. This method of washing insures the removal of soap and other impurities present in the polymer.

The polymer is soluble in toluene, ethyl acetate, acetone and MEK. It is insoluble in n-heptane.

Specific viscosity, 1.60; Huggin's Constant, 0.47; Brookfield viscosity, 765 cps. (15% in MEK).

This polymer is a pressure-sensitive adhesive polymer. It is softer and tackier than the polymer of the previous example. The creep resistance of this polymer, as a measure of its cohesive strength, is less than the creep resistance of the previous polymer. Adhesive tapes were prepared from a solution of this polymer by spreading films of the polymer upon polyethyleneterephthalate film (Mylar) from a solution containing the polymer and 0.8% hexamethylene diamine. The hexamethylene diamine compound crosslinked the polymer upon heating. Extremely high creep resistance was obtained. In some instances, the tape did not creep even after 60 days of creep resistance testing.

Additional polymers of this invention are set forth in Table III in which are tabulated acrylate and methacrylate co-monomers and the molar amounts in which they were present in the polymerization charge with one mol of N-t-$C_{12}$ maleamic acids. These polymers were prepared by the emulsion polymerization system generally described above and as illustrated in Examples 1 and 2. The catalysts employed were the redox combination of potassium persulfate/sodium bisulfite in all examples except in the instances of Examples 4, 7 and 11. The polymers of Examples 4, 7 and 11 where prepared with hydrogen peroxide/ferrous ammonium sulfate initiator/activator combination.

TABLE III

| Comonomers Amounts, mols | Examples | | | | | | | | | | | | | | | | |
|---|---|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 | 18 | 19 |
| Acrylates: | | | | | | | | | | | | | | | | | |
| Methyl | | 6 | | | | | | | | | | | | | | | |
| Ethyl | 1 | | 2 | 1 | 2 | | | | | 1 | 1 | | | | | | |
| n-Butyl | 4 | | | 6 | | | 4 | 2 | | | | 4 | | | | | |
| iso-Butyl | | | | | | | 4 | | | | | | | | | | |
| t-Butyl | | | | | 2 | 4 | | | | | | | | | | | |
| 2-ethylhexyl | | | | | | | | | | 4 | 4 | 2 | 3 | | | | |
| Decyl | | | | | | | | | | | | | | 3 | | | |
| Methacrylates: | | | | | | | | | | | | | | | | | |
| n-Butyl | | | | | | | | | | | | | | | | 1 | 1 |
| Hexyl | | | | | | | | | | | | | | | 4 | | |
| Octyl | | | | | | | | | | | | | | | | 0.9 | 2.1 |
| Decyl | | | | | | | | | | | | | | | | 3.1 | 7.9 |
| Dodecyl | | | | | | | | | | | | | | | | | 2 |

All of the polymers tabulated in Table III exhibited adhesive properties, except in the case of the polymer of Example 8. A film cast from a solution of this N-t-$C_{12}$ maleamic acid-t-butyl acrylate polymer was hard and plastic.

Although t-butyl acrylate was the sole acrylate with the amic acid in the polymer did not yield a pressure-sensitive adhesive polymer, it may be employed in pressure-sensitive adhesive polymers of this invention with other acrylate esters of non-tertiary alkyl alcohols. The other acrylates need not be the alkyl acrylates which by themselves are capable of polymerizing to a pressure-sensitive adhesive state; see Example 7. This N-t-$C_{12}$ maleamic acid/ethyl acrylate/t-butyl acrylate polymer is tacky and suitable as a single component pressure-sensitive adhesive polymer. It is elastic and softer than the Example 8 polymer, although it does not have the degree of softness usually characteristic of many conventional rubber-resin pressure-sensitive adhesives. A softer polymer employing t-butyl acrylate may be obtained by mixing with higher alkyl acrylates or by using larger amounts of either non-tertiary alkyl acrylates or the non-conformable amic acid.

Polymers of Examples 1–7 contain alkyl acrylates in which the alkyl chains contain less than or an average less than 4 carbon atoms. The Example 5 polymer was a rather low molecular weight polymer. Crosslinking or curing this polymer with 1% of an epoxy compound (Epoxide 201) and 0.5% tetraethylene pentamine results in an improvement in cohesive strength. The molecular weight of a polymer of the monomers employed in Example 5 may be increased by methods of polymerization known in the art and thereby improve cohesive strength.

Example 3 polymer has a higher molecular weight than the Example 2 polymer as indicated by their respective intrinsic viscosities (Example 2 polymer: 1.60; Example 3 polymer: 2.55). The cohesive strengths of these polymers, as measured by resistance to creep, are shown in a subsequent section of this disclosure.

The polymer of Example 4 is a harsh pressure-sensitive adhesive. The Example 6 polymer is softer than the polymers of Examples 1, 2, 3 and 7, indicating a trend towards softer polymers in this series with increasing length of the alkyl acrylate monomer or average acrylate monomer in the polymer.

In the polymer series of Examples 8 to 11 in which the sole acrylates are butyl acrylates, the trend is to softer polymers from the N-t-$C_{12}$ maleamic acid polymers with t-butyl, to isobutyl, to n-butyl acrylates. The Example 9 polymer is a harsh pressure-sensitive adhesive, rather firm and stiff, but softer than the amic acid/t-butyl (Example 8) polymer previously described.

The continuation of the trend to less stiff, less harsh, more flexible, softer and tackier polymers is apparent from polymers of Examples 12 to 16. The pressure-sensitive adhesive polymers of Example 12 and 13 are softer than the pressure-sensitive adhesive polymer of Example 2. The Example 14 polymer also is a suitable single component pressure-sensitive adhesive polymer. With respect to softness it is about equivalent to polymers of Examples 12 and 13. The polymers of Examples 15 and 16 were rather low molecular weight polymers, quite soft and tacky. The polymers of Examples 15 and 16 are suitable for use as label adhesives. The creep resistance of these polymers is improved when they are cured or crosslinked without substantial adverse effect on tack and adhesion.

The polymers of Examples 17 to 19 are pressure-sensitive adhesive polymers prepared from methacrylates in which $R_2$ averages from less than 6 to 10 carbon atoms. The Example 17 polymer is classifiable as a harsh pressure-sensitive adhesive.

In Table IV are tabulated polymer compositions containing various types of monomer(A) recurring units and different compositions thereof with respect to the complexity of the $R_1$ groups of the monomer(A) molecules. All of the polymers of Table IV are pressure-sensitive adhesive polymers whether the monomer(B) is of the acrylate type or the methacrylate type. The polymer of Example 25, however, was substantially free of tack when cast from solution as a thin film upon a flexible strip of a polyethyleneterephthalate sheet. The thin film of polymer appeared to be partially crystalline. Upon heating at 350° F. for 2 minutes the polymer became extremely tacky, lost its crystalline appearance and remained tacky for the several months during which the tape was observed and tested. The tertiary octyl maleamic acid monomer from which the Example 25 polymer was prepared was a substantially pure monomer and, as previously described was crystalline in its monomeric state.

As explained previously, the N-t-$C_9$ monomer(A) is a partially crystalline solid. The polymer of Example 22 prepared therefrom exhibited no apparent crystallinity and was pressure-sensitive as prepared. The t-butyl monomer(A) is a crystalline solid; however, the Example 24 polymer prepared therefrom exhibited no apparent crystallinity. It was pressure-sensitive as prepared, illustrating that complex monomer(A) compositions are not necessary in the case of the N-lower alkyl monomer(A) components. A polymer prepared from the crystalline mixture of N-n-alkyl maleamic acids averaging about 14 carbon atoms in the alkyl groups (previously described) and a mixture of ethyl and butyl acrylates was crystalline and not tacky. This polymer contained about 34% amic acids and 66% acrylates, by weight.

TABLE IV

| Comonomers Amounts, Mols | Examples | | | | | | | | | | | | |
|---|---|---|---|---|---|---|---|---|---|---|---|---|---|
| | 20 | 21 | 22 | 23 | 24 | 25 | 26 | 27 | 28 | 29 | 30 | 31 | 32 |
| MONOMER(A) | | | | | | | | | | | | | |
| Maleamic acid: | | | | | | | | | | | | | |
| N-t-$C_{21}$ | 1 | 1 | | | | | | | | | | | |
| N-t-$C_9$ | | | 1 | | | | | | | | | | 1 |
| t, i-, n-Butyl [a] | | | | 1 | | | | | | | | | |
| t-Butyl | | | | | 1 | | | | | | | | |
| t-Octyl | | | | | | 1 | | | | | | | |
| Di (2-ethylhexyl) | | | | | | | 1 | | | | | | |
| Di-$C_4$ [b] | | | | | | | | | | | 1 | 1 | |
| Itaconamic Acid: N-t-$C_{12}$ | | | | | | | | 1 | | | | | |
| Citraconamic Acid: N-t-$C_{12}$ | | | | | | | | | 1 | | | | |
| Maleimide: N-t-$C_{12}$ | | | | | | | | | | 1 | | | |
| MONOMER(B) | | | | | | | | | | | | | |
| Acrylates: | | | | | | | | | | | | | |
| Ethyl | 5 | 1 | 1 | 1 | 1 | 1 | 1 | 1 | 1 | 1 | 6.8 | | |
| n-Butyl | | | | | | | | 6 | 6 | 4 | | | |
| 2-ethylhexyl | | | 4 | 4 | 4 | 4 | 4 | 4 | | | | | |
| Methacrylates: | | | | | | | | | | | | | |
| Hexyl | | | | | | | | | | | | | 3.8 |
| Octyl | | | | | | | | | | | | 0.6 | |
| Decyl | | | | | | | | | | | | 2.2 | |
| Dodecyl | | | | | | | | | | | | 2.9 | 2.5 |

[a] A mixture of the maleamic acids of the tertiary, iso and n-butyl isomers prepared by reacting 1 mol of maleic anhydride with ⅓ mol each of the butyl primary amine isomers.
[b] A mixture of N-dialkyl amic acids of maleic anhydride and a mixture of equi-molar amounts of di-n-butyl, diisobutyl, diamyl and dipropyl amines.

2. AMIDO(MONOCARBOXYLIC MONOMER(A): MONOMER(B) POLYMERS (a) *Amido(Monocarboxylic)Monomer (A).* — These amido-type monomers are the N-alkyl substituted acrylic and methacrylic acids represented by the structures

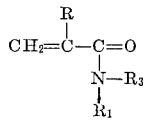

$R_1$ in the case of these monomer(A) molecules average from about 6 to 24 carbon atoms. When the $R_1$ alkyl groups average less than 11 carbon atoms, the alkyl groups may be all the same in which case the $C_7$ to $C_{10}$ alkyl groups are all branched. Acrylamide or methacrylamide monomer(A) compositions which are mixtures of $C_7$ to $C_{10}$-$R_1$ substituted molecules are preferred to those in which the molecules contain all the same $C_7$ to $C_{10}$-$R_1$ groups. As the average size of the $R_1$ alkyl groups increases, the monomer(A) molecules must consist to an increasing extent of mixtures of molecules in which the branched alkyls are different, either as isomers or homologues or preferably both. Long straight chain alkyl substituted amides should be used sparingly if at all, as a component of monomer(A) when $R_1$ averages from $C_6$ to $C_{10}$, and particularly when the branched alkyl $R_1$ groups are all alkyl groups containing no more than 10 carbon atoms. The presence of N-substituted straight chain alkyl amido monocarboxylic monomer(A) molecules is more readily tolerated in the case of mixtures in which $R_1$ averages above about $C_{10}$ and may be beneficial to the nonconformability and complexity of the monomer(A) compositions and its influence upon the balance of tack, adhesion and cohesion of the pressure-sensitive adhesive polymers of this invention.

In the case of pressure-sensitive adhesive polymers containing monocarboxylic amide monomer(A) recurring units having $R_1$ groups which average from 6 to 10 carbon atoms (whereby the monomer(A) composition in its corresponding monomeric form may vary from a liquid to crystalline solid), crystalline solid monomeric monomer(A) compositions tend to occur in the case when all of the $R_1$ groups thereof are the same in size and configuration. The proportion in which the $C_6$ to $C_{10}$ alkyl amido monocarboxylic monomer(A) compositions, which in their monomeric form are crystalline solids, may be combined in the pressure-sensitive adhesive polymers is ordinarily no more than about 25% by weight of the (A) and (B) recurring units of the polymer. When the monomeric form of the amido monocarboxylic monomer(A) recurring units averaging from 6 to 10 carbon atoms is an amorphous solid or, preferably, a liquid material, the proportions thereof may be as high as 50% by weight of the (A) and (B) recurring units in the polymer in the case of amide monomer(A):acrylate monomer(B) polymers.

The monocarboxylic amido monomer(A) composition must be a liquid in its monomeric form as the average size of the $R_1$ groups thereof increases above about 10 carbon atoms. This requirement is satisfied as the extent of branching in $R_1$ increases and as the extent of mixing of molecules having different branched $R_1$ groups increases. To illustrate, monomeric N-t-butyl acrylamide is a crystalline solid whereas the monomeric mixture of N-t-$C_9$ acrylamides and the monomeric mixtures of N-t-$C_{12}$ acrylamides are viscous liquids, generally having the solubility characteristics aforedescribed for the preferred monomer(A) compositions in the pressure-sensitive adhesive polymers of this invention. Generally, the monocarboxylic amido monomer(A) compositions tend to be liquids at a lower average $R_1$ size than the amic acid monomer(A) compositions for $R_1$ groups of the same extent of branching and mixing. This is indicated by a comparison of the N-t-$C_9$ acrylamide and the aforedescribed N-t-$C_9$ amic acids. The preferred monocarboxylic amido monomer(A) compositions are those which in their monomeric state are liquid mixtures of molecules in which the average number of carbon atoms of $R_1$ is from about 8 to about 24, particularly 11 to 24, and in which the $R_1$ groups consist principally of alkyl groups having a number of carbon atoms within the average range. Examples of these are the acrylamide and methacrylamide derivatives of the aforedefined N-t-$C_9$, N-t-$C_{12}$ and N-t-$C_{21}$ amines.

(b) *Acrylate monomer(B).*—Generally the number of carbon atoms in $R_2$ of the acrylate monomer may average from about 3 to 13 when $R_1$ is lower alkyl averaging from about 6 to 10 carbon atoms. As the average size of $R_1$ increases to within the 11 to 24 carbon atom range and the extent of branching and mixing therein increases (ideally to the extent that the mixture of monomer(A) molecules is a liquid, as aforedescribed), $R_2$ may average from 1 to about 13 carbon atoms.

Within the range of proportions of 1:19 to 3:1 for monocarboxylic amido monomer(A):acrylate monomer(B) pressure-sensitive adhesive polymers having the stated tackiness, the proportions range from 1:19 to about 1:1 when $R_1$ are $C_6$ to $C_{10}$ alkyl groups and in which case $R_2$ averages from about $C_3$ to $C_{13}$ alkyl groups. The approximate maximum within this range when $R_1$ consists of all the same (i.e. unmixed) alkyl groups and $R_2$ consists of all the same alkyl groups or a mixture of different alkyl groups is 1:3. This maximum is reached when $R_2$ averages about 8 carbon atoms. The maximum proportion gradually decreases as the number of carbon atoms in $R_2$ decreases from 8 to 3 and increases from 8 to 13. The amide monomer(A) and acrylate monomer(B) may be combined in the polymer in the maximum ratio of 1:1 when monomer(A) consists of a mixture of molecules having different $C_6$ to $C_{10}$ alkyl groups and the $R_2$ of the acrylate monomer(B) consists of either all the same alkyl groups or a mixture having different $C_1$ to $C_{14}$ alkyl groups averaging from 3 to 13 carbon atoms. This maximum is gradually approached as the average number of carbon atoms in $R_2$ increases from 3 and is reached at about 8.

Mixing of $C_1$ to $C_5$ alkyl substituted monomer(A) monocarboxylic amides with $C_6$ to $C_{10}$ alkyl substituted monomer(A) monocarboxylic amides, but in amounts such that the average size of $R_1$ is still within the 6 to 10 carbon atom range, has no appreciable beneficial effect upon increasing the range of the proportions. On the other hand, adding branched alkyl substituted monomer (A) amides having more than 10 carbon atoms in the alkyl groups thereof, but in amounts such that the average is still within the 6 to 10 carbon atom range, permits a gradual increase in the maximum proportion of the monomer(A) in the polymer. As the addition causes a gradual increase in the average number of carbon atoms of the alkyl groups to within the 10 to 24 carbon atom range the amount of monomer(A) which may be combined with monomer(B) can be increased to the aforestated maximum of three parts of monomer(A) to one part of monomer(B). Polymers of (A):(B) monomers in the weight ratio of at least 1:4 when monomer(A) is a mixture of $C_6$ to $C_{10}$ primary amides are preferred.

$R_2$ of acrylate monomer(B) may average from 1 to 13 carbon atoms when the monocarboxylic amido monomer(A) is a complex mixture of extensively branched nonconformable $R_1$ alkyl substituted amides averaging from 11 to 24 carbon atoms in the $R_1$ groups and consisting essentially of branched alkyl groups above 10 carbon atoms in size, for example the N-t-$c_{12}$ alkyl amides described above. The range of proportions, by weight, of monomer(A):monomer(B) pressure-sensitive adhesive polymers is 3:17 to 3:1 when $R_1$ averages above 10 carbon atoms and $R_2$ averages less than 3 carbon atoms. Generally, the amount of monomer(A) when $R_2$ averages less than 3 carbon atoms should be increased above the minimum as the complexity of $R_1$ groups decreases and as the average number of carbon atoms of $R_1$ substituted amides selected to constitute monomer(A) decreases within the range of 11 to 24 carbon atoms.

(c) *Methacrylate monomer(B)*.—The average number of carbon atoms in the $R_2$ groups of the methacrylate monomer(B) ranges from 6 to 14 in the case of acrylamide monomer(A):methacrylate monomer(B) pressure-sensitive adhesive polymers and from 8 to 14 in the case of the methacrylamide monomer(A):methacrylate monomer(B) adhesive polymers.

The proportions in which monocarboxylic amido monomer(A) can be combined with methacrylate monomer (B) depends upon whether the amides of monomer(A) are acrylamides or methacrylamides. Generally, the proportion range for pressure-sensitive adhesive acrylamide monomer(A):methacrylate monomer(B) polymers is from 1:9 to 3:2, by weight. The proportion range for pressure-sensitive adhesive methacrylamide monomer (A):methacrylate monomer(B) polymers is 1:9 to 1:1. The mol ratio of monomer(A) to methacrylate monomer (B) should not exceed 1:1, and preferably should not exceed a mol ratio of 1:2.

The previously discussed factors as to size and configuration of the $R_1$ groups and complexity of the monomer(A) composition in the case of the monocarboxylic monomer(A):acrylate monomer(B) polymers are generally applicable to the determination of proportions of (B) to (B) in the acrylamide monomer(A):methacrylate monomer(B) type of polymers and the methacrylamide monomer(A):methacrylate monomer(B) type of polymers.

The minimum proportion in which either an acrylamide or methacrylamide monomer(A) can be combined with methacrylate monomer(B) decreases and the maximum proportion increases as the average size of $R_1$ increases and the complexity of the monomer(A) composition increases. Within each proportion range the proportion of monomer(A) increases to the maximum of the range as the average sizes of $R_1$ and $R_2$ increase and the complexity of the composition of monomer(A) and (B) increase. The greatest latitude in composition of methacrylate monomer(B) and proportions of (A) to (B) is obtained with the highly complex monomer(A) compositions, particularly those which are the liquid to viscous semi-solid compositions.

Within the proportion range of 1:9 to 3:2 for acrylamide monomer(A):methacrylate monomer(B) polymers, the maximum does not exceed 1:3 when $R_1$ of the acrylamide monomer molecules contain from 6 to 10 carbon atoms and are all the same size and configuration. Increasing the complexity of the $C_6$ to $C_{10}$ acrylamide monomer(A) composition makes it possible to obtain pressure-sensitive adhesive polymers in which the weight ratio of (A) to (B) is as high as 2:3. Acrylamide monomer(A) compositions consisting essentially of mixtures of amides in which the $R_1$ groups contain more than 10 carbon atoms and average from 11 to 24 carbon atoms can be combined with $C_6$ to $C_{14}$ methacrylate monomer (A) compositions in weight ratios up to as high as 3:2 to yield pressure-sensitive adhesive polymers.

The weight ratios of (A) to (B) for $C_6$ to $C_{10}$ alkyl substituted methacrylamide monomer(A):$C_8$–$C_{14}$ methacrylate monomer(B) pressure-sensitive adhesive polymers may vary from 1:4 to 2:3, not to exceed a weight ratio of 1:3 in the instance when the $R_1$ groups are all the same size and configuration. The weight ratio of (A) to (B) for $C_{11}$–$C_{24}$ alkyl substituted methacrylamide monomer(A):$C_8$–$C_{14}$ methacrylate monomer(B) pressure-sensitive adhesive polymers is 1:9 to 1:1.

Examples of polymers of this invention wherein the (A) monomer consists of monocarboxylic amido derivatives are set forth in Examples 33 to 40.

*Example 33*

A N-t-$C_{12}$ acrylamide:ethyl acrylate polymer was prepared by emulsion polymerization of equimolar amounts of the N-t-$C_{12}$ acrylamide and ethyl acrylate. An emulsion of these monomers in water was prepared with the aid of an appropriate amount of sodium lauryl sulfate. An aqueous solution of sodium bisulfite and an aqueous solution of sodium persulfate were added to the emulsion. Polymerization began at about 5° C. and the temperature rose as the catalyst was added to the emulsion. The temperature did not exceed about 50° C. After addition of catalyst caused no further increase in temperature the polymer was coagulated by the addition of salt, separated from the reaction mixture and dried. The intrinsic viscosity was 0.71 and Huggin's Constant was 0.28. The soft, rubbery and sticky polymer was soluble in toluene, chloroform and cyclohexane.

A thin coating of the polymer was spread from a solution thereof upon a polyethyleneterephthalate film and dried. The adhesive tape so produced exhibited an Instron probe tack of about 442 grams, a peel adhesion of about 54 ounces and a room temperature creep resistance of 22.7 hours.

Example 34

A sample of the adhesive tape of Example 33 was irradiated under a 360 watt ultra violet light lamp at a rate of 32 inches per second. The polyethyleneterephthalate film backing showed signs of beginning to melt under the high temperatures of the lamp. Even though the backing began to melt the polymer did not degrade. The 160° F. creep resistance of the irradiated tape was 21 minutes, a several-fold increase over the non-irradiated sample.

Table V sets forth the mol ratios of monomers used in preparing the polymers in accordance with the technique disclosed in Example 33. Also set forth are properties of the polymers and adhesive tapes made therefrom. The backings of the tapes were either polyethyleneterephthalate film or paper on which the polymers were solvent spread as explained in Example 33.

TABLE V

| Comonomers Amounts, mols | Examples | | | | |
|---|---|---|---|---|---|
| | 35 | 36 | 37 | 38 | 39 |
| Acrylamide: | | | | | |
|   N-t-$C_{12}$ | 1 | 1 | | 1 | |
|   N-t-$C_9$ | | | 1 | | |
| Methacrylamide: N-t-$C_{12}$ | | | | | 1 |
| Acrylates: | | | | | |
|   Ethyl | 1 | | 1 | | |
|   n-Butyl | 5 | 3 | | | |
|   2-ethylhexyl | | | | | 3 |
|   Decyl | | | | | 1 |
|   Tridecyl [1] | | | 3 | | |
| Methacrylates: | | | | | |
|   Butyl | | | | 1 | |
|   Octyl | | | | 0.9 | |
|   Decyl | | | | 3.1 | |
| Properties: | | | | | |
|   Intrinsic Viscosity | 3.25 | 1.95 | | | |
|   Huggin's Constant | 0.40 | 0.39 | | | |
|   Probe Tack (gms.) | [2] 268 | [2] 254 | 570 | 1,020 | 700 |
|   Adhesion (oz./inch) | 30 | 42 | | | |
|   Creep Failure Time,[3] hrs | 28.9 | 0.5 | | 0.016 | |

[1] An acrylate prepared from a $C_{13}$ alcohol produced by the oxo alcohol process.
[2] Instron probe tack.
[3] At 160° F.

Example 40

Portions of the polymers of Examples 35 and 36 were dissolved in toluene in the weight ratio of 2:1. A thin coating of the mixture of polymers was spread upon a polyethyleneterephthalate film from the solution and dried. The Instron probe tack, peel adhesion and 160° F. creep resistance of this tape were, respectively, 281 grams, 30 ounces and 7.2 hrs.

Example 41

The polymer of this example was prepared by emulsion copolymerization of N-t-$C_{12}$ methacrylamide and butyl methacrylate. These monomers were present in the molar ratio of 1:2 in the emulsion. The emulsifiers employed were 5% each of sodium lauryl sulphate and nonylphenoxypoly (ethylene oxy) ethanol. The catalyst was 2.5% potassium persulphate and 1.5% sodium bisulphite. The starting temperature was 53.2° C. The yield was 92%. The rubbery polymer was not a pressure-sensitive adhesive polymer. It had no measurable probe tack value. The polymer may be used as a hot melt adhesive.

3. AMINO-SALT MONOMER(A):MONOMER(B) POLYMER

In the case of these polymers useful in or as pressure-sensitive adhesives, the (A) monomer is a mixture of N-alkyl amino salts of either acrylic acid or methacrylic acid, or both, corresponding to the formula $$CH_2=C(R')-COOH \cdot NH(R_1)(R_3)$$

wherein the average size of the $R_1$ alkyl groups is from about 8 to 24 carbon atoms and wherein substantially all of the $R_1$ groups are branched. The requirements as to extent of mixing and branching in $R_1$ for the preferred mixtures of monocarboxylic amido monomer(A) molecules averaging 8 to 24 carbon atoms in the $R_1$ groups thereof are applicable to the amino-salt monomer(A):monomer(B) polymers. The composition of the ester monomer(B) and the proportion ranges in which the amino-salt monomer(A) and monomer(B) may be combined in the polymers useful for pressure-sensitive adhesive purposes are the same as in the case of the monocarboxylic amide monomer(A):monomer(B) polymers wherein (A) is a mixture of the amides in which the alkyl groups average from 8 to 24 carbon atoms. Examples 42 to 44 are examples of these polymers in which the only (A) components are amino-salts.

Example 42

The polymer of this example was prepared by solution polymerization of N-t-$C_{12}$ acrylic acid salt and ethyl acrylate in the molar proportion of 1:2.6. The catalyst, benzoyl peroxide, was dissolved in the monomers and the solution thereof was added slowly to benzene under reflux conditions. The soft polymer was insoluble in aliphatic hydrocarbons such as heptane and cyclohexane.

An adhesive tape was prepared by coating a polyethyleneterephthalate film with a thin layer of this polymer. The adhesive layer was tacky to the touch. The tape adhered to moist skin.

Example 43

The polymer of this example was prepared by solution polymerization of N-t-$C_{12}$ acrylic acid salt, ethyl acrylate and acrylic acid in the molar proportion of 1:2.2:0.39. The monomers were copolymerized in solution using benzoyl peroxide as a catalyst. The catalyst was first dissolved in the monomers and this solution was added slowly to the benzene under reflux conditions. The polymer was relatively hard and was not itself useful as a pressure-sensitive adhesive.

A solution of equal parts by weight of this polymer and polymer of Example 45 was prepared. A thin layer of this mixture of polymers was cast from the solution on a polyethyleneterephthalate film. The pressure-sensitive adhesive tape thus produced had an Instron probe tack of about 225 grams, a peel adhesion of about 94 ounces and a room temperature creep resistance of about 45 hours. The tape adhered to moist skin.

Example 44

Pressure-sensitive adhesive compositions may be prepared by mixing amino-salt monomer(A):monomer(B) polymers with plasticizers. A N-t-$C_{21}$ acrylic acid salt: ethyl acrylate:acrylic acid polymer was prepared by emulsion polymerization of the corresponding monomers in molar proportions of 1:1:0.2. The polymerization conditions were substantially the same as set forth in Example 33. The tough rigid polymer was soluble in chloroform and insoluble in acetone and toluene. A coating consisting of 60% polymer, 20% epoxy resin (Polyox X450) and 20% glycerine was cast from a solution thereof onto a paper backing and dried. The dried adhesive coating was very tacky and adhered to moist skin. Upon heating at 120° C. for ten minutes it thermoset to a tough, non-tacky coating.

The presence of N-alkyl amino-salts as comonomeric recurring units in the adhesive polymers of this invention appears to impart thereto the ability to adhere to moist surfaces. This is further illustrated in the amido(A): ester(B):amino-salt polymers of Examples 45 to 47.

Example 45

This polymer was prepared from N-t-$C_{12}$ acrylamide, butyl acrylate, acrylic acid and N-t-$C_{12}$ acrylic acid salt in the molar proportion of 1.08:2.3:4:1. An aqueous emulsion of these monomers in the stated molar proportion was prepared and polymerization was conducted in the manner described in Example 33, except that the starting temperature of polymerization was about 40° C. Its intrinsic viscosity and Huggin's Constant were, respectively, 0.31 and 0.56. It was soluble in cyclohexane and toluene. The polymer was extremely tacky and rubbery, and a coating thereof on a tape backing adhered to moist skin. The Instron probe tack was 200 grams, the peel adhesion was 58 ounces and the room temperature creep resistance was 5.0 hours.

Example 46

An N-t-$C_{12}$ acrylamide:ethyl acrylate:N-t-$C_{12}$ acrylic salt polymer was prepared by emulsion polymerization of the monomers in the mol proportion of 1:4:1. The polymerization was conducted in the manner described in Example 33. The rubbery polymer was tacky and stiff. It was soluble in toluene and chloroform and insoluble in heptane. The intrinsic viscosity and Huggin's Constant were respectively, 0.46 and 1.3. The polymer by itself was unsuitable for use as a pressure-sensitive adhesive. A mixture of 60 parts of this polymer and 40 parts of chlorinated biphenyl (Arachlor) was dissolved in a solvent and a coating of this mixture was spread on a polyethyleneterephthalate film and dried to remove solvent. The pressure-sensitive adhesive tape thus produced had an Instron probe tack of 395, a peel adhesion of 32 ounces and a 160° F. creep resistance of about 1 hour. The tape readily adhered to moist skin.

Example 47

This polymer was prepared by emulsion polymerization of one mol of N-t-$C_{12}$ maleamic acid, one mol of ethyl acrylate, one mol of n-butyl acrylate and one mol of N-t-$C_{12}$ acrylic acid salt. The polymer was a pressure-sensitive adhesive polymer suitable for use in tape form. The polymer had high adhesion and tack. The adhesion to a substrate increased with time.

4. HALF-ESTER MONOMER(A):MONOMER(B) POLYMERS (a) *Half-ester monomer(A).* — The half-ester type monomers of the monomer(A) class are the half-esters (acid-esters) of monoethylenically unsaturated acids, such as maleic, fumaric, citraconic, and itaconic acids, represented by the structures

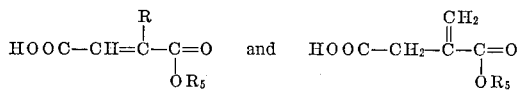

The composition of the half-ester monomer(A) for these pressure-sensitive adhesive polymers is a mixture of molecules corresponding to any one of the above structures in which the $R_5$ groups thereof either are not all the same size or, it all the same size, contain alkyl groups of different branched configurations. For convenience the mixture of monomer(A) molecules shall be described herein as the half-esters of an acid and a mixture of alkyl alcohols. The $R_5$ alkyl groups of the esters shall be the alkyl groups of the alcohols with which the acid is esterified.

The mixture of alcohols from which the half-esters may be formed are alcohols selected from alcohols of the group consisting of $C_1$ to $C_{24}$ alkyl alcohols. At least 50% of the alcohols selected are non-tertiary alkyl alcohols. The alcohols are so selected from the mixture such that the average number of carbon atoms of the alkyl groups thereof (and hence, the $R_5$ groups of the half-ester molecules of the above formulas) is from about 8 to 18. The alcohols selected which contain more than 7 carbon atoms in the alkyl groups are branched alkyl alcohols.

Preferred monomer(A) compositions are those in which all of the $R_5$ groups of the half-esters contain at least 8 carbon atoms and consist essentially of different branched alkyl groups. The $R_5$ branched alkyl groups may differ in size as in homologues, or in configuration as in isomers, or preferably, may differ in both size and configuration as in isomers and homologues.

Monomer(A) compositions which are liquid in their monomeric form are preferred. Generally, the mixtures of half-esters must be liquids when the average size of the $R_5$ branched alkyl groups is greater than about $C_{10}$ in some cases, or about $C_{12}$ in other cases, depending upon the specific identity of the components of the mixture. Liquid mixtures of half-ester monomer(A) molecules occur as the average size of $R_5$ increases within the range of from $C_8$ to $C_{18}$ and particularly from about $C_{12}$ to $C_{18}$, by increasing the extent of branching in the $R_5$ groups and/or by increasing the number of different branched $R_5$ groups in the half-esters.

Following are examples of preferred liquid monomeric monomer(A) compositions prepared by esterifying the dicarboxylic acids with mixtures of alcohols. The esters may be prepared by a number of known methods with or without the use of conventional acidic esterification catalysts. Discoloration and other disadvantages of such methods may be avoided, however, by catalyzing the esterification reaction by means of alkali metal salts of aliphatic acids, such as the salts of acetic acid, propionic acid, butyric acid and the like. The esterification reaction proceeds rapidly in the presence of these catalysts at low temperatures. Substantially complete conversion to the maleate half-esters has been obtained on heating the mixture of alcohols at 50°–90° C. with a slight excess of maleic anhydride in benzene using 2% by weight of sodium propionate based on the weight of the alcohol. Solvents other than benzene may be used, including, for example, acrylates and methacrylates with which the half-esters subsequently are to be copolymerized.

Suitable mixtures of branched alkyl alcohols which may be employed in the preparation of the half-esters are the higher oxo alcohols. The higher oxo alcohols are mixtures of alcohols containing at least 8 carbon atoms in the alkyl groups thereof. Isooctyl oxo alcohol, decyl oxo alcohol and tridecyl oxo alcohol are mixtures of primary alkyl alcohols in which the average number of carbon atoms in the alkyl groups thereof are, as the name indicates, 8, 10 and 13, respectively. Isooctyl oxo alcohol is composed of the following isomers: about 20% 3,4-dimethyl-1-hexanol, about 30% 3,5-dimethyl-1-hexanol, about 30% 4,5-dimethyl-1-hexanol, about 15% of a mixture of 3-methyl-1-heptanol and 5-methyl-1-heptanol, and about 5% of unidentified alcohols. Decyl oxo alcohol consists predominantly of trimethylheptanol isomers and tridecyl oxo alcohol consists mainly of tetramethylnonanol isomers. There are no isomers in these oxo alcohols with a quaternary carbon atom.

Example A.—TDM half-esters

This monomer(A) composition was prepared from tridecyl oxo alcohol and maleic anhydride and for convenience in future reference is designated TDM half-esters. One mol of tridecyl oxo alcohol and a slight molar excess (10% by weight) of maleic anhydride were added to benzene in the presence of 1% sodium propionate by weight of the reactants. The reaction is exothermic. The temperature of the reaction mixture was kept at about 50° C. for about one hour to obtain a yield of about 95%.

The tridecyl monomaleates were removed from the solvent. If desired the half-esters may be washed with water to remove the unreacted maleic anhydride and salt.

Approximately 95% conversion was also obtained using stoichiometric amounts of the reactants and conducting the reaction at 95° C. for a period of 10 minutes. The rate of reaction is slow after about 95% conversion. Rate studies show, however, that the yield can be increased by allowing the reaction mixture to stand at room temperatures from 24 to 36 hours.

*Example B.—MTDM half-esters*

This monomer(A) mixture was prepared by heating in a solvent one mol of maleic anhydride with a mixture of ⅓ mol tridecyl oxo alcohol, ⅓ mol hexadecyl alcohol and ⅓ mol isodecanol. The hexadecyl alcohol is a mixture of branched alkyl alcohols averaging 16 carbon atoms in the alkyl groups thereof. It is marketed by the Enjay Chemical Company as "hexadecyl alcohol." The isodecanol, marketed by Union Carbide Chemical Company, is described as a mixture of $C_{10}$ alkyl alcohol isomers. It is common practice to describe mixtures of alcohols made by the oxo process by the name of the alcohol having the number of carbon atoms in the alkyl group corresponding to the average number of carbon atoms of the alcohols of the mixture, it being understood that the name is used as a collective noun. The number of carbon atoms in the alkyl groups of the half-esters so produced averages 13, as in the case of the TDM half-esters. The MTDM half-ester composition of this example, however, consists of a mixture of $C_{10}$, $C_{13}$ and $C_{16}$ alkyl half-ester isomers and homologues.

*Example C.—MOM half-esters*

This monomer(A) mixture of half-esters was prepared by heating in a solvent 0.9 mol of maleic anhydride with 0.9 mol of the following mixture of alcohols:

| | Mol |
|---|---|
| 2-ethylhexanol | 0.1 |
| 2,6-dimethyl-4-heptanol | 0.2 |
| Isodecanol | 0.2 |
| 2-ethylbutanol | 0.1 |
| 2-methylpentanol | 0.1 |
| 2,2,4-trimethylpentanol | 0.1 |
| 4-methyl-2-pentanol | 0.1 |

All of the alcohols were obtained from Union Carbide Chemical Company. This MOM half-ester composition consists of a mixture of half-ester isomers and homologues averaging 8 carbon atoms in the alkyl groups thereof.

*Example D.—MTDI half-esters*

One mol of itaconic anhydride was reacted with one mol of the mixture of alcohols described in Example B and in the manner there set forth to produce a mixture of branched alkyl monoitaconates average 13 carbon atoms in the alkyl groups thereof.

(b) *Acrylate monomer(B).*—The average number of carbon atoms in the $R_2$ groups of these molecules may range from 1 to 14, depending upon the complexity of monomer(A). The preferred acrylates are those which are esters of primary and secondary alkyl alcohols averaging from 3 to 13 carbon atoms in the alkyl groups thereof.

The general range of proportions for the monomer(A) and acrylate monomer(B) combined in the polymer is from 1:19 to 7:3, by weight, of the (A):(B) monomers, respectively, provided the mol ratio does not exceed 1:1. This range of proportions is applicable to the monomer (A) as previously described and the acrylate monomer (B) in which the alkyl groups of the acrylates average at least 3 carbon atoms. When $R_2$ averages less than 3 carbon atoms, the range of weight proportions is from 3:17 to 7:3. It is to be understood that the range of proportions in which a given monomer(A) and monomer(B) can be copolymerized to pressure-sensitive adhesive polymers depends upon the complexity of monomer (A) as described above and the complexity of the combination of both monomers(A) and (B). Generally, the acrylates selected for combination with the higher alkyl half-ester, such as the $C_{16}$ to $C_{18}$ alkyl half-esters, should be the lower alkyl acrylates, for example the alkyl acrylates having less than about 9 carbon atoms in the alkyl groups thereof. These acrylates permit greater latitude in the choice of proportions thereof in the production of polymers having a tack value of at least about 100 grams.

(c) *Methacrylate monomer(B).*—The methacrylate monomer (B) recurring units of the pressure-sensitive adhesive polymers correspond to esters of methacrylic acid and non-tertiary alkyl alcohols containing from 1 to 14 carbon atoms and averaging from 4 to 14 carbon atoms.

Generally, the proportion range for pressure-sensitive adhesive monomer(A):methacrylate monomer(B) polymers is from 1:19 to 3:2, by weight. The mol ratio of monomer(A) to methacrylate monomer(B) should not exceed 1:1, and preferably should not exceed a mol ratio of 1:2.

The minimum proportion in which monomer(A) can be combined with methacrylate monomer(B) decreases and the maximum proportion increases as the average size of $R_5$ increases and the complexity of the monomer(A) composition increases. Within the proportion range the proportion of monomer(A) increases to the maximum of the range as the average sizes of $R_5$ and $R_2$ increase and the complexity of the composition of monomer(A) and (B) increase. The greatest latitude in composition of methacrylate monomer(B) and proportions of (A) to (B) is obtained with the highly complex monomer(A) compositions.

The polymers of the tapes of the examples of this section were prepared by emulsion polymerization employing a redox catalyst system. In a typical polymerization, the monomer(A) half-esters and monomer(B) esters were emulsified in a solution of distilled water of sodium lauryl sulfate and potassium persulfate. A portion of this emulsion was added to the reactor along with a solution of sodium bisulfite in distilled water. The remainder of the emulsion was then added slowly, usually over a period of about one hour. The initial temperature of the reaction mixture was about 50–65° C. The hydrogen peroxide catalyzed reactions were initiated at a starting temperature of about 17–20° C. and conducted at a temperature no higher than about 50° C.

The polymer was separated from the polymerization medium by coagulation with salt. The coagulum was either washed with water and dried or first dissolved in methyl ethyl ketone and then precipitated therefrom with water and dried. The adhesive tapes of the following examples were prepared from the polymers thus produced, unless otherwise designated. Also, tapes were prepared from the polymers which were extracted with methanol to remove uncombined monomers.

Although a portion of one or more of the monomers may in some cases remain uncombined during polymerization, it need not be separated from the polymer unless present in very large proportions. For optimum properties of the copolymer adhesive, however, such uncombined monomers should be removed, for example, by methanol extraction. In the following examples the reported percentages of half-esters combined in the polymer were calculated on the basis of the yield of the extracted polymer and the amount of half-ester extracted therefrom. The tape backing in each case was a poly-

Example 48

A polymer was prepared from 22.8 parts of the MOM half-ester reaction product as prepared in Example C, 10.0 parts of ethyl acrylate and 84.8 parts of decyl acrylate. The polymer was extracted with methanol. The amount of MOM half-esters combined in the polymer was about 20.6% by weight of the polymer. A pressure-sensitive adhesive tape was prepared by dissolving the polymer in methylethyl ketone, coating the polymer solution upon the film and evaporating the solvent therefrom. The thickness of the polymer coating was about 1.8 mils. The adhesive tape had a probe tack of 810 grams, a peel adhesion after 2 minutes contact with the substrate of 45 ounces and a peel adhesion of 47 ounces after 16 hours contact.

Example 49

A polymer was prepared from 29.8 parts of the TDM half-esters as prepared in Example A, 40.0 parts of ethyl acrylate and 12.8 parts of butyl acrylate. The polymer was extracted with heptane. A pressure-sensitive adhesive tape was prepared in which the polymer coating was about 1.6 mils thick. The probe tack was 700 grams, the 2 minute and 16 hours peel adhesions were 36 and 33 ounces, respectively, and the creep resistance was about 0.15 hour.

Example 50

A polymer was prepared from 29.8 parts of the TDM half-esters of Example A, 10.0 parts of ethyl acrylate and 51.2 parts of butyl acrylate. The dried polymer was extracted with methanol. The polymer coating on the tape was approximately 1.6 mil thick. The probe tack was about 680 grams, the 2 minutes and 16 hours peel adhesions were 28 and 45 ounces, respectively, and the creep resistance was about 3.3 hours.

Example 51

A polymer was prepared from 29.8 parts of the half-ester reaction product obtained by heating maleic anhydride with tridecyl oxo alcohol, 10.0 parts of ethyl acrylate and 73.6 parts of 2-ethylhexyl acrylate. A portion of this polymer as coagulated, washed and dried was dissolved in methyl ethyl ketone. A pressure-sensitive adhesive tape was prepared by spreading a 1.6 mil coating of the polymer on the film from this solution. The probe tack was 570 grams, the 2 minutes and 16 hours peel adhesions were both 22 ounces, and the creep resistance was 0.25 hour.

Another portion of this polymer was extracted with methanol and a tape prepared therefrom by solvent spreading as described. The half-esters combined in the polymer amounted to 24.6% by weight of the polymer. The probe tack was 830 grams, the peel adhesion after 2 minutes was 27 ounces, and the creep resistance was 0.48 hour.

Example 52

Three portions of the methanol extracted polymer of Example 51 were separately dissolved in the methyl ethyl ketone to which were added, respectively, 20 parts of a non-heat reactive phenol-formaldehyde resin having softening point of 100° C. (Durez 19900, sold by The Hooker Electro Chemical Company), 20 parts of a bicycloheptadiene-terpene copolymer tackifier resin (softening point 66° C.), and 20 parts of a glycerol ester of wood rosin (Staybelite Ester No. 10, sold by The Hercules Chemical Company). The bicycloheptadiene-terpene copolymer was prepared by copolymerizing the diene and wood turpentine mixture of terpenes in a 1:9 mol ratio. Tapes were prepared by solvent spreading a coating approximately 1.6 mils thick of each of the blends of polymer and resins upon the film backing. The adhesive coating made with the blend of the polymer and phenol-formaldehyde tackifier resin had a probe tack of 1230 grams, a peel adhesion of 40 ounces (both after 2 minutes and 16 hours contact), and a creep resistance of 0.63 hour. The adhesive coating prepared from the blend of the polymer and the bicycloheptadiene-terpene tackifier resin had a probe tack of 1050 grams, a peel adhesion of 28 ounces after 2 minutes contact and 30 ounces after 16 hours contact, and a creep resistance of 0.16 hour. The adhesive coating containing the wood rosin ester had a probe tack of 940 grams, a peel adhesion of about 27.5 ounces after both 2 minutes and 16 hours contact and a creep resistance of 0.37 hour.

Example 53

A polymer was prepared from 29.8 parts of the TDM half-ester of Example A, 10.0 parts of ethyl acrylate and 73.6 parts of 2-ethylhexyl acrylate. The polymer was mixed with 20 parts of the Durez resin per 100 parts of the polymer in methyl ethyl ketone. An adhesive tape was prepared by coating the film with this mixture. The dried coating was approximately 1.6 mils thick. The probe tack was 830 grams, the 2 minute peel adhesion was 36 ounces and the 16 hour peel adhesion was 47 ounces.

Example 54

A portion of the polymer of Example 53 was extracted with methanol. The TDM half-esters combined in the extracted polymer amounted to 24.6% by weight of the polymer. A pressure-sensitive adhesive tape was prepared from the methanol extracted polymer in the manner described above. The adhesive polymer coating was approximately 1.6 mils thick. The probe tack was 710 grams, the peel adhesion after 2 minutes was 18 ounces. The peel adhesion after 16 hours was 24 ounces. The creep resistance was 0.07 hour.

Example 55

To 100 parts of the methanol extracted polymer of Example 53 dissolved in methyl ethyl ketone was added 20 parts of the aforedescribed Durez resin and a pressure-sensitive adhesive tape was prepared therefrom. The probe tack was 910 grams, the peel adhesion after 2 minutes was 52 ounces and the creep resistance 0.04 hour.

Example 56

A polymer was prepared from 29.8 parts of the MTDM half-ester reaction product of Example B, 10.0 parts of ethyl acrylate and 73.6 parts of 2-ethylhexyl acrylate. An adhesive tape prepared therefrom had a probe tack of 550 grams, a peel adhesion of 12 ounces after 2 minutes and a peel adhesion of 20 ounces after 16 hours.

A portion of the polymer of this example was extracted with methanol. The half-ester combined in this polymer amounted to 19.2% by weight of the polymer. An adhesive tape prepared from the methanol extracted polymer had a probe tack of 790 grams, a peel adhesion of 33 ounces after 2 minutes contact and a creep resistance of 0.07 hour.

Example 57

A polymer was prepared from 29.8 parts of the TDM half-esters of Example A, 14.2 parts of butyl methacrylate, 17.8 parts of octyl methacrylate and 70.0 parts of decyl methacrylate. A pressure-sensitive adhesive tape was prepared therefrom in which the thickness of the polymer coating was about 1.6 mils. The probe tack was 750 grams, the 2 minutes and 16 hours adhesion were 13 and 17 ounces, respectively.

Example 58

A polymer was prepared from 29.8 parts of the MTDM half-ester reaction product of Example B, 14.2 parts of the butyl methacrylate, 17.8 parts of octyl methacrylate and 70.0 parts of decyl methacrylate. The polymer was purified by extraction with methanol and an adhesive tape was prepared in the manner described above. The probe tack was 870 grams. The 2 minute peel adhesion was 38 ounces. The 16 hour peel adhesion was 55 ounces. The creep resistance was 1.1 hours.

Example 59

A polymer was prepared from 11.4 parts of the MOM half-ester reaction product of Example C, 5.7 parts of ethyl methacrylate and 50.8 parts of lauryl methacrylate emulsified with 10% sodium lauryl sulfate (based on the total weight of the monomers) and 150 parts of distilled water. To the monomer emulsion was added triethylamine. The surfactants were removed by washing the polymer crumbs with water. A sample of the washed polymer was dissolved in toluene and a 1.6 mil coating of the polymer was spread therefrom on the film backing. The pressure-sensitive adhesive tape had a probe tack of 300 grams and a creep resistance of less than one minute.

Example 60

A citraconate half-ester was prepared by reacting citraconic anhydride with the mixture of alcohols described in Example C. To a solution of 0.9 mol (plus 10% by weight excess) of citraconic anhydride in anhydrous isopropyl acetate containing 3% sodium propionate was added 0.9 mol of the mixed octyl alcohols at 50–60° C. After addition was completed, the temperature was raised to 85°±5° C. and kept there for about two hours, then left at room temperature for about 16 hours. The half-ester solution was washed with water and the solvent removed under vacuum.

A polymer was prepared from 24.2 parts of this half-ester reaction product, 10.0 parts of ethyl acrylate and 73.6 parts of 2-ethylhexyl acrylate using 12% sodium lauryl sulfate and 250 parts of distilled water as the emulsifying system, 10.3 parts of triethyl-amine were added to the monomer emulsion. The redox system was the same as in Example 59. The temperature of the reaction ranged from 55.5–71.5° C. A 1.6 mil coating of the polymer was spread from a toluene solution thereof. The adhesive tape had a probe tack of 340 grams and a creep resistance of 0.065 hour.

A portion of this polymer was extracted with methanol. The citraconate half-esters combined in the polymer amounted to 15.6% by weight of the polymer. An adhesive tape prepared therefrom had a probe tack of 560 grams and a creep resistance of 0.125 hour.

5. OPTIONAL COMONOMERS

The polymers of this invention may contain recurring units therein other than the essential monomer(A) and monomer(B) recurring units. The other recurring units may be characterized in their corresponding monomeric form as monomers copolymerizable with monomers(A) and (B). Thus, the polymers of the adhesive coatings of this invention are polymers of monomers consisting essentially of monomers(A) and (B) and, optionally, one or more copolymerizable monomers in amounts which do not materially adversely effect the use of the polymers, for example, in the adhesive coatings of the tapes of this invention. These optional copolymerizable monomers shall be referred to as "C" monomers.

Examples of copolymerizable (C) monomers are: ethylenically unsaturated mono- and dicarboxylic acids, such as acrylic acid, methacrylic acid, maleic acid, citraconic acid and itaconic acid; nitriles of said acids, such as acrylonitrile and methacrylonitrile; unsubstituted amides of said acids; unsubstituted imides of said dicarboxylic acids; unsubstituted amide-ester derivatives of said dicarboxylic acids; and esters of said mono- and dicarboxylic acids and such alcohols as aromatic substituted alkyl alcohols, monocyclic and polycyclic alkyl alcohols, halogen substituted alkyl alcohols, amino-substituted alkyl alcohols, cyanoalkyl alcohols, and alkoxy-alkyl alcohols. Examples of the aforementioned classes of alcohols are benzyl alcohol, dehydrobietyl alcohol, dihydroabietyl alcohol, tetrahydroabietyl alcohol, cyclohexyl alcohol, terpene alcohols, chloroethyl alcohol, fluoroethyl alcohol, N-dimethylaminoethyl alcohol, cyanoethyl alcohol, ethoxyethyl alcohol, to name a few.

Vinyl esters, vinyl ethers, vinyl substituted aromatic compounds and copolymerizable olefinic hydrocarbons also may be copolymerized with monomers(A) and (B), such as vinyl acetate, vinyl propionate, vinyl hexanoate, methyl vinyl ether, propyl vinyl ether, octyl vinyl ether, tridecyl vinyl ether, vinyl chloride, vinylidene chloride and styrene.

The copolymerizable monomers, and mixtures of monomers, such as those set forth above and herein included in the term "monomer(C)" may be present in the polymers in amounts from 0–50% by weight of monomers(A) and (B), depending upon the identity of monomers(A) and (B) and relative proportions thereof.

Preferred copolymerizable monomers are acrylic acid, methacrylic acid, alpha-beta and alpha-alpha unsaturated dicarboxylic acids and anhydrides, N-dialkyl aminoalkyl esters of these acids, vinyl ethers, vinyl acetate and styrene. Particularly preferred polymers are those containing polar reactive groups such as free carboxylic acid groups which may be provided by amic acid monomers and/or copolymerizable acid monomers. The property of dwell adhesion has been observed with some of foregoing polymers containing polar groups. The free carboxylic acid groups offer reactive sites for crosslinking purposes. Polymers of this invention have been prepared containing relatively large amounts of free carboylic acid groups. Thus the polymers of Examples 61, 62 and 63 of Table VI contain respectively, 10.6%, 12.9% and 16% free carboxylic acid groups, by weight of the polymer. Crosslinking of these polymers can be accomplished in a matter of seconds.

The examples of Table VI set forth representative polymers of the invention containing a monomer(C) component. All of the polymers of Table VI were pressure-sensitive adhesive polymers as prepared except in the case of the Example 63 polymer. This polymer as prepared was tack free. It may be used as a binder for non-woven fabrics or as a thermoplastic adhesive. A pressure-sensitive adhesive was prepared with this polymer by plasticization thereof with glycerine. Generally, the polymers containing acrylic acid monomer(C) are somewhat tougher than polymers not containing the acid.

Acrylonitrile imparts a stiffening effect to the polymers. The polymer of Example 64 is stiffer, for example, than the polymer of Example 11 of Table III. It is suitable for use as a single component pressure-sensitive adhesive and may be classified as a harsh adhesive. If a tackier polymer of the monomers of Example 64 is desired, reducing the acrylonitrile content will result in polymers of increased tack. A tackier and softer, less harsh polymer can also be obtained by substituting larger size acrylates, preferably mixtures of the acrylates, for the butyl acrylate employed in the Example 64 polymer.

Generally, if the cyano group is attached to the alkyl chain of the alkyl acrylate, the effect upon tackiness and other properties is quite different from the effect of the cyano group when the nitrogen groups thereof is attached directly to a terminal carbon atom of the acrylic monomer as is acrylonitrile. The cyanoethyl acrylate-containing polymer of Example 65 was less stiff than the Example 64 polymer, the latter exhibiting much lower tack and adhesion.

The pressure-sensitive adhesive polymer of Example 66 may be characterized as a thermosetting adhesive. As produced, the polymer had a creep resistance of about 9 minutes. After heating for about 10 minutes at 350° F. the creep resistance improved to about 19 hours. It appears that this polymer is capable of crosslinking by itself.

Example 73

A copolymer was prepared from 29.8 parts of the TDM half-esters of Example A, 10.0 parts of ethyl acrylate, 73.6 parts of 2-ethylhexyl acrylate and 14.4 parts of acrylic acid. The pressure-sensitive adhesive tape

TABLE VI

| Comonomers Amounts, mols | Examples | | | | | | | | | |
|---|---|---|---|---|---|---|---|---|---|---|
| | 61 | 62 | 63 | 64 | 65 | 66 | 67 | 68 | 69 | 70 |
| Maleamic Acid: N-t-$C_{12}$ | 1 | 1 | 1 | 1 | 1 | 1 | 1 | 1 | 1 | 1 |
| Acrylates: | | | | | | | | | | |
| Ethyl | 1 | 1 | 1 | | | | | | | 1 |
| n-Butyl | 4 | | | 4 | 4 | 4 | | | | |
| 2-ethylhexyl | | 4 | 4 | | | | | 4 | 4 | 4 |
| Tridecyl [a] | | | | | | | 2 | | | |
| Monomer(C): | | | | | | | | | | |
| Acrylic Acid | 2 | 2 | 4 | | | | | | | |
| Acrylonitrile | | | | 2 | | | | | | |
| Cyanoethyl Acrylate | | | | | 1 | | | | | |
| Ethoxyethyl Acrylate | | | | | | 2 | | | | |
| Abitol[b] Acrylate | | | | | | | 1 | | | |
| Vinyl Acetate | | | | | | | | 2 | | |
| Styrene | | | | | | | | | 2 | |
| Itaconic Acid | | | | | | | | | | 1.5 |

[a] The ester of acrylic acid and tridecyl oxoalcohol.
[b] Abitol is technical hydroabietyl alcohol, an alcoholic mixture produced from rosin acids which have been hydrogenated to reduce their unsaturation. It contains about 15% of non-alcoholic material; the alcohol portion is about 45% tetrahydroabietyl alcohol, 40% dihydroabietyl alcohol and 15% dehydroabietyl alcohol. It is marketed by Hercules Powder Company; see Abitol brochure 10M 9–55 21051.

Example 71

An aqueous emulsion of N-t-$C_{12}$ acrylamide, hydroxyethyl methacrylate and dodecyl methacrylate in the molar proportions of 1:1:3 was prepared with the aid of 5% each of sodium lauryl sulphate and polyalkylene glycol ether. The catalyst consisted of 1.8% potassium persulfate and 1.0% sodium bisulphite. The starting temperature was 58° C. The yield was about 84%.

The molecular weight of this polymer as prepared was too low for use by itself as a pressure-sensitive adhesive polymer. An adhesive tape prepared by solvent spreading in the manner described in Example 33 was heated at 350° C. for several minutes. After the heat treatment, during which it is believed that crosslinking occurs through the hydroxy groups, the tape had a probe tack value of 920 grams and a 160° F. creep resistance of about 22 hours. The creep resistance failure was a cohesive failure.

Example 72

The polymer of this example was prepared by copolymerizing N-t-$C_{12}$ acrylamide, ethyl acrylate, 2-ethylhexyl acrylate and acrylic acid in the molar proportion of 1:1:4:2. An emulsion of these monomers was prepared employing 8% sodium lauryl sulphate and 3% nonylphenoxypoly (ethylene oxy) ethanol. Approximately 0.1% dodecyl mercaptan was added to the emulsion. The catalyst consisted of 1% potassium persulphate and 0.6% sodium bisulphite, each added separately to the emulsion. The starting temperature of polymerization reaction mixture was 51.5° C. The yield of the coagulated washed and dried reaction product was 97%. The probe tack of an adhesive tape made by solvent spreading a thin coating of this polymer upon a film backing was 740 grams.

Pressure-sensitive adhesive polymers of this invention containing free carboxylic groups may be crosslinked by reacting polyfunctional compounds therewith. The acrylic acid component of the polymer of Example 72 provides a suitable site for reaction with such compounds. Crosslinking may be desirable for the purpose of improving the cohesive strength of the polymer.

having a 1.6 mil thick coating of the polymer had a probe tack of 180 grams. The peel adhesions were 3 ounces for 2 minutes contact and 10 ounces after 16 hours contact. The creep resistance of the tape was greater than 100 hours.

Example 74

To a methyl ethyl ketone solution of 100 parts of the polymer of Example 73 was added about 20 parts of the aforedescribed Durez tackifier resin. A pressure-sensitive adhesive tape was prepared as described above. The coating of the blend of the polymer and tackifier resin was approximately 1.6 mils thick. The probe tack was 350 grams; the peel adhesions were 17 ounces after 2 minutes and 25 ounces after 16 hours. The creep resistance was greater than 24 hours.

Example 75

A copolymer was prepared from 29.8 parts of the TDM half-esters of Example A, 10.0 parts of ethyl acrylate, 73.6 parts of 2-ethylhexyl acrylate and 10.4 parts of styrene. A pressure-sensitive adhesive tape was prepared as described above. The polymer coating was about 1.6 mils thick. The probe tack was 380 grams. The adhesion after 2 minutes was 31 ounces. The creep resistance was 0.17 hour. This polymer was prepared by employing a hydrogen peroxide/ferrous sulphate catalyst. The initial temperature of the reaction mixture was 17° C. The temperature did not exceed 47° C. during the polymerization reaction.

Example 76

A polymer was prepared from 29.8 parts of the MTDM half-ester reaction product of Example B, 10.0 parts of ethyl acrylate, 73.6 parts of 2-ethylhexyl acrylate and 5.3 parts of acrylonitrile. The polymer was extracted with methanol. The amount of the half-esters combined in the polymer was about 16.9% by weight of the polymer. The polymer was dissolved in methyl ethyl ketone and a 1.8 mil coating of the polymer was spread therefrom on the film backing. The pressure-sensitive adhesive tape had a probe tack of 800 grams, a peel adhesion of 30 ounces after 2 minutes and 37 ounces after 16 hours and a creep resistance of about 0.7 hour.

6. CROSSLINKED POLYMERS

Free carboxylic acid groups in the polymer are reactive groups and serve as sites for further reaction, such as crosslinking. By means of crosslinking it is possible to improve the cohesive strength of the polymer. As shown by the tape examples in Table VII, cured or crosslinked pressure-sensitive polymers have been produced with substantial improvement in the property of cohesion, without adhesive failure and without deleterious deterioration of tack. Thermosettable pressure-sensitive adhesive polymers have also been made. The degree of thermoset depends upon the amount of cross-linking agent employed in the polymer.

Suitable agents for crosslinking or curing the polymer include polyfunctional organic compounds, organic peroxides, epoxy compounds, formaldehyde resins and polyvalent metals capable of reacting with free carboxylic acid groups. Crosslinking of the polymers may also be accomplished by exposure to irradiation (see Example 34), such as ultraviolet light irradiation and electron beam irradiation. Polyfunctional organic compounds include polyamines, polyhydroxy compounds and polyisocyanates such as hexamethylene diamine (1,6-hexanediamine), tetraethylene pentamine, cyanoguanidine, 1,4-butanediol, and epoxy compounds. Organic peroxides employed with success are benzoyl peroxide, dicumyl peroxide, di-t-butyl peroxide and cumene hydroperoxide. Zinc hydroxide and calcium oxide are polyvalent metal compounds which apparently crosslink by reaction with free carboxylic acid groups in the polymer. Suitable formaldehyde resins are phenol-formaldehyde resins (e.g. Resinox 433 available from Monsanto) and melamine-formaldehyde resins. It is to be understood that the crosslinking agents specifically set forth herein are not intended as a limiting list of such agents, but rather as a teaching illustration by which others may choose crosslinking agents for reaction with the polymers.

The pressure-sensitive adhesive tapes of the following examples were prepared by spreading the adhesive from solution upon a polyethyleneterephthalate film or paper backing. Solutions of the polymers were prepared in MEK with and without crosslinking agents. After coating the pressure-sensitive adhesive polymer on the backing the tapes were permitted to dry for several hours at room temperature. The dried adhesive coatings varied from 1 to 2 mils in thickness. During storage, the adhesive coatings were faced with a release paper.

The pressure-sensitive adhesive polymer to which crosslinking agents were added were cured in an air-circulating oven at 150° F. to 400° F. for various periods of time. The adhesive properties of the cured adhesive tapes hereinafter set forth are those properties of the adhesives cured without release paper protectively covering the adhesive unless otherwise specified. In many instances it appears that there was less reduction in tack when cured without the release paper covering the adhesive.

The resistance to creep is designated by "NC" in Table VII if the tape did not creep more than ⅛ to ¼ inch at the end of at least about 48 hours. The tapes of Examples 66 and 68 did not creep even after 60 and 40 days, respectively, of testing. The creep resistance in many instances was so great that the tapes were subjected to extreme conditions of testing to determine creep resistance limits. Adhesive crosslinked with hexamethylene diamine, benzoyl peroxide and calcium oxide did not creep either at 160° F. or 240° F. even under loads of 2 kg. The pressure-sensitive adhesive polymer of Example 2 crosslinked with diamine, did not creep even at 320° F. under a load of 2 kg. for one week. Removal of the tape from the test plate showed that this polymer had thermoset. In contrast, tapes made with the polymer of Example 2 containing the diamine that were exposed to temperatures of 160° F. and even 240° F. for two and three months were still tacky and had high adhesion.

In some examples, two values are given in the Adhesion Column; the value in parentheses is the adhesion of the tape measured after testing for creep resistance.

TABLE VII

| Adhesive Polymer of Example | Crosslinking Agent, percent | Cure, Min./° F. | Tack, g. | Adhesion, Oz./In. | Creep Failure Time, 160° F. |
|---|---|---|---|---|---|
| 1 | | | *245 | 85 | 4.2 hrs. |
| 2 | | | *620 | 68 | 0.9 hr. |
| 2ª | Diamine, 0.8 | 5/250 | *360 | 39 | NC. |
| 2ª | Diamine, 0.8 | 1/350 | | | NC. |
| 2ª | Bz₂O₂, 2 | 10/250 | *228 | 36 | NC. |
| 3 | | | 967 | 38 | 5.1 hrs. |
| 12 | | | *375 | 53 | 7.0 min. |
| 12ª | CaO, 5 | 2/350 | | | NC. |
| 12ª | Diamine, 0.8 | 2/350 | *290 | 50 | NC. |
| 12 | DiCup, 2 | 5/250 | | | 10 min. |
| 12 | TEPA, 0.5 | 2/350 | | | NC. |
| 12 | Epoxy 5 | 2/350 | | | NC. |
| 13 | | | 1,086 *(225) | 70 | 2.4 min. |
| 13 | Bu₂O₂, 2 | 2/150 | 1,058 | 57 | 6 min. |
| 13 | Bz₂O₂, 2 | 1/300 | 1,261 | 60 | 5 hrs. |
| 13 | CuOOH, 2 | 2/150 | 1,068 | 52 | 7 min. |
| 13 | MFR, 2 | 2/350 | 1,032 | 50 | 16 min. |
| 13 | MFRZ, 2 | 2/350 | 938 | 50 | 48 min. |
| 13 | TY, 0.78/1.0 | 1/350 | 1,072 | 39 | NC. |
| 13 | TY, 1.0/0.5 | ½/350 | 1,028 | 43 (44) | NC. |
| 13 | TY, 1.0/0.5 | 5/350 | 870 | 37 (43) | NC. |
| 13 | TY, 1.0/0.5 | 10/350 | 956 | 37 | NC. |
| 9 | | | 1,370 | 63 | 7 min. |
| 9 | TY, 0.5/1.0 | ½/350 | 1,232 | 52 (75) | NC. |
| 10 | | | 134 | 15 (65) | NC. |
| 10 | TY, 0.5/1.0 | ½/350 | 316 | 34 (37) | NC. |
| 15 | | | 1,054 | ᵇ S | 0.01 hr. |
| 15 | TY, 0.5/1.0 | 1/350 | 1,117 | 38 (58) | NC. |
| 16 | | | 715 | ᵇ S | |
| 16 | TY, 0.5/1.0 | 1/350 | 696 | 35 (42) | NC. |
| 20 | | | 1,374 | 54 | 1 min. |
| 20 | TY, 1.2/1.0 | 2/350 | 73 | 10 | NC. |
| 28 | | | ᵇ S | ᵇ S | 1 min. |
| 28 | TY, 1.2/1.0 | 2/350 | 1,186 | 70 | NC. |
| 26 | | | ᵇ S | ᵇ S | 1 min. |
| 26 | TY, 1.2/1.0 | 2/350 | 1,100 | 35 | NC. |
| 47 | | | *348 | 86 | 26 min. |
| 47 | Epoxy, 5 | 2/350 | *288 | | NC. |

See footnotes at end of table.

TABLE VII—Continued

| Adhesive Polymer of Example | Crosslinking Agent, percent | Cure, Min./° F. | Tack, g. | Adhesion, Oz./In. | Creep Failure Time, 160° F. |
|---|---|---|---|---|---|
| 65 | | | *558 | 83 | 2 hrs. |
| 65 | TEPA, 0.5 | 2/350 | *84 | 53 | NC.c |
| 64 | | | *228 | 52 | 27 min. |
| 64 | TEPA, 0.5 | 2/350 | *178 | 31 | NC.c |
| 66 | | | *307 | 32 | 9 min. |
| 66 | | 10/350 | *387 | | 19 hrs. |
| 66 | TEPA, 0.6 | 2/350 | *414 | 20 | NC. |
| 62 | | | *480 | 94 (140) | NC.d |
| 62 | Diamine, 0.2 | 2/350 | *492 | 42 | NC.d |
| 19 | | | 610 | 29 | 1 min. |
| 18 | | | 1,060 | 42 | .02 hr. |
| 31 | Diamine, 2.5 | 5/350 | *(284) 890 | 16 | 0.1 hr. |
| 32 | | | 440 | 2 | 1 min. |
| 32 | Diamine, 2.5 | 2/350 | 275 | 58 | 4.1 hrs. |
| 24 | | | *149 | 31 | 5.0 hrs. |
| 25 | | 2/350 | *302 | | |
| 25 | Diamine, 0.4 | 2/350 | *278 | 29 | NC. |
| 22 | | | *228 | 43 | 0.08 hr. |
| 22 | Diamine, 0.4 | 2/350 | *205 | 37 | NC. |
| 59 | Diamine, 0.2 | 5/350 | 1,020 | 42 | 1 min. |
| 60 | Diamine, 0.2 | 10/350 | 600 | 22 | 0.23 hr. | a Release paper on during cure.
b Adhesive sheared during test.
c During 20 days at 250° F.
d After 35 days of test, very tacky to touch.
* Instron tack values; all others are probe tack values.

The Diamine in the Crosslinking Agent Column is 1,6-hexane diamine; $Bz_2O_2$ is benzoyl peroxide; BDOL is 1,4-butaendiol; DiCup is dicumyl peroxide; the epoxy compound is a dicyclo diepoxy carboxylate (Epoxide 201; Union Carbide Chemicals); TEPA is tetraethylene pentamine; $Bu_2O_2$ is di-t-butyl peroxide; CuOOH is cumene hydroperoxide; MFR is melamine formaldehyde resin and MFRZ is the same resin plus a small amount of zinc chloride; and TY is a mixture of TEPA and Epoxide 201. The numerals appearing after the crosslinking agents are the percent of crosslinking agents, based on the weight of the polymer.

The rate of crosslinking decreases as the size of the alkyl group in the acrylates increases. The crosslinking reaction with polyfunctional agents is quite rapid, particularly in the adhesives of the polymers containing acrylic acid. In the case of crosslinking agents which react with the acid groups, crosslinking is accomplished in a matter of a few minutes at temperatures of about 250° F., and in less than a minute at a temperature of about 350° F.

The combination of the tetraethylenepentaamine and the epoxy compound is somewhat superior to either the amine or the epoxy compound alone. The epoxy compound appears to reduce the rate of the curing action and the number of crosslinks. The amount of crosslinking can be controlled by varying the ratio of the epoxy to the amine.

Included among the tape examples are illustrations of crosslinking or curing serving to convert a rather cohesively weak pressure-sensitive adhesive polymer to a pressure-sensitive adhesive polymer suitable for use as strapping tapes and the like. See the TY crosslinked polymers of Examples 13, 15, 16, 26 and 28 of Table VII.

In addition to improving cohesive strength, crosslinking can also increase the resistance of the polymers to solvents. This is illustrated in Table VIII with the polymer of Example 13. The "Percent Gel" in the table is a measurement of the insolubility of the polymer.

The tapes used for the determinations set forth in Table VIII were prepared in the manner previously described. The tapes were heated for various periods of time and at the temperature as stated in the table. After the heat treatment each tape sample was immersed in toluene in a closed container and tumbled for a period of at least 48 hours. The insoluble polymer was filtered from the toluene, dried and weighed.

TABLE VIII.—TY CROSSLINKING AGENT, 0.2% AND 1.0% OF TEPA AND EPOXY

| Min. at 350° F. | Percent Gel | Tack, g. | Adhesion, oz. |
|---|---|---|---|
| ½ | 64 | 1,103 | 47 |
| 2 | 62 | 1,097 | 43 |
| 10 | 77 | 927 | 42 |

TEPA CROSSLINKING AGENT, 1%

| | | | |
|---|---|---|---|
| ½ | 75 | 1,272 | 39 |
| 2 | 91 | 1,093 | 34 |
| 10 | 95 | 756 | 22 |

$Bz_2O_2$ CROSSLINKING AGENT, 2%

| | | | |
|---|---|---|---|
| 2 | 33 | 1,023 | 53 |
| 5 | 33 | 1,057 | 56 |
| 10 | 40 | 1,078 | 56 |

The percent gel reported in the table is that obtained by dividing the weight of the dried insoluble polymer by the weight of the polymer prior to immersion in the toluene. The tack values of Table VIII are probe tack values.

An adhesive tape prepared with the pressure-sensitive adhesive polymer of N-t-$C_{12}$ maleamic acid:ethyl acrylate:butyl acrylate (1:1:4 mol ratio) containing 0.5% by weight of 4,4'-bis-(diethylamino) benzophenone, based on weight of the polymer. The tape was exposed to ultraviolet light irradiation in the presence of air. The creep resistance of the irradiated tape was substantially greater than the creep resistance of the unirradiated tape.

Crosslinked polymers of this invention can also be prepared in situ, during the polymerization reaction. This may be accomplished by the addition of small amounts of divinyl monomers to the polymerization charge. Suitable divinyl monomers are diesters of polyhydroxy alcohols and vinyl unsaturated acids such as the ethylene glycol diacrylates and dimethacrylates; esters of vinyl unsaturated alcohols and vinyl unsaturated acids, such as allyl acrylates and allyl methacrylates; and divinyl unsaturated hydrocarbons, such is divinyl benzene. These divinyl monomers copolymerize with monomers (A) and (B) and become an integral part of the polymer chains. Other monomers which also become a part of the polymer chains and serve as crosslinking monomers similar to the divinyl monomers are the di-(alpha-beta or alpha-alpha monoethylenically unsaturated acid) esters or amides of dihydroxy alcohols or diamines, such as the dimaleate ester of ethylene glycol, the dicitraconate ester of said glycol, the diitaconate ester of said glycol, and the corresponding diamic derivatives of these acids and alkyl amines such as ethylene diamine. The amounts of these crosslinking copolymerizable monomers which may be added to the polymerization charge of course depends upon the extent of crosslinking desired, the particular monomer to be used and the composition of the other recurring units in the polymer. Less than about 3%, based on the weight of the polymer, of the copolymerizable crosslinking monomers may be sufficient for the pressure-sensitive adhesive polymers of the invention. Generally the amount of these monomers may be from about 0 to 10% by weight of the polymer.

The adhesive polymers prepared by emulsion polymerization may be spread upon suitable tape backings directly from the polymerization mixture, as indicated previously. In such instances, it may be desirable to add thickening agents to improve the spreading qualities of the polymer. Adhesive tapes have been prepared in this manner with a polymer prepared from N-t-$C_{12}$ maleamic acid:ethyl acrylate:2-ethyl-hexyl:ethylene glycol dimethacrylate in the molar ratio of 1:1:4:0:056. The polymer was prepared by a delayed addition emulsion polymerization technique employing a catalyst system of hydrogen peroxide and ferrous ammonium sulfate. The initial temperature was 11.5° C.; the maximum temperature of the emulsion during polymerization was 24.5° C. The emulsifier was a combination of ammonium lauryl sulfate and nonylphenoxypoly (ethyleneoxy) ethanol. After the polymerization was completed, 2% of methyl ethyl cellulose (Methocel), based on the polymer, was added to the emulsion. This emulsion with the thickener was coated onto a polyethyleneterephthalate film and allowed to dry overnight at room temperature. The tape was then heated in an air circulating oven for 5 minutes at 125° C. The adhesive coating was about 1.5 mils thick. The probe tack was 630 grams. The peel adhesion was 20 ounces per inch. The tape did not creep even after 4 days of testing at 160° F.

It will be readily apparent to those skilled in the art that the pendent groups of the esters and amides of the monomer(C) class may contain a functional reactive group which can react with, for example, free carboxylic acid groups in the polymers or other reactive groups. Such monomers are esters and amides of acrylic acid, methacrylic acid and the alpha-beta monoethylenically unsaturated dicarboxylic acids in which the esterifying alcohol or amidifying amine contains an hydroxy group or an amino group in addition to the group reacted with the acids to form the ester or amide, or an epoxy group. Examples of such monomers are the amides of these acids with an alkanol amine such as methylol amine and ethanol amine; monoesters of polyhydroxy alcohols such as ethylene glycol; monoamides of alkyl polyamines such as ethylene diamine; and esters of epoxy compounds such as glycidol. Polymers prepared containing monomer(A), monomer(B) and an ester or amide monomer of the type set forth in this paragraph are crosslinkable polymers as prepared, as distinguished from the polymers previously described as crosslinked in situ. These crosslinkable polymers can be cured by heating the polymer; see Example 71. They do not require the addition of a curing agent. The use of large amounts of such monomers containing these functional groups should be avoided in pressure-sensitive adhesives intended to be used under exposure to high temperatures unless the adhesive tape is to be permanently attached to the substrate. The factors applicable in determining amounts of these difunctional monomers in the polymer are generally the same as in the case of the divinyl monomers previously described.

Polymers of this invention are compatible with a variety of resins, among which are included resins known in the pressure-sensitive adhesive art as tackifier resins such as rosin, hydrogenated rosin, ester derivatives of rosin and hydrogenated rosin, heat-advancing and non-heat-advancing phenol formaldehyde resins, terpene-phenolic resins, phenol modified rosin, polyester resins and terpene-phenolic resins, phenol modified rosin, polyester resins and terpene-bicyclo-hepadiene resins. The latter resins are described in U.S. Patent 3,058,964.

The addition of plasticizers may be desirable, as in the case of the beneficial effect of glycerine when blended with the polymer of Example 63 previously described. Other plasticizers are dialkyl phthalates such as dioctyl phthalate; monomeric and polymeric alkyl esters of aliphatic dicarboxylic acids such as diisooctyl adipate and the polymeric condensation products of sebacic acid and 1,2-propylene glycol; sucrose acetate isobutyrate; chlorinated biphenyl; the viscous liquid mixtures of N-alkyl amic acids hereinabove described; tricresyl phosphate; and diphenyl ether.

Synthetic polymers may be blended with polymers of this invention, including polyvinyl methyl ether, polyvinyl ethyl ether and SBR rubbers. Adhesive tapes may also be prepared wherein the adhesive is a blend of two or more polymers of this invention, see Example 40.

Polymers which are not per se pressure-sensitive adhesive polymers prepared from the liquid to viscous semi-solid complex mixtures of monomer(A) molecules in which the $R_1$ groups thereof average from 8 to 24 carbon atoms and acrylic or methacrylic monomers may be employed as hot melt adhesives, laminating adhesives, impregnants or coating for fibrous webs such as papers, non-woven fabrics, textile fabrics and the like. The acrylate and/or methacrylate comonomers may be esters of the larger size alcohols averaging well above $C_{14}$ alcohols, including up to about $C_{28}$ alcohols. For these non-pressure-sensitive adhesive polymers the proportions in the polymer of these liquid to viscous semi-solid monomer(A) components may vary over a wide range. In its broadest aspect, these monomer(A) components may be viewed as imparting a flexibilizing effect to the polymers, particularly in the case of the comonomer acrylates and methacrylates which by themselves yield rigid polymers. Accordingly, the proportions of the amido or amino-salt monomer(A) and acrylic and/or methacrylic recurring units in the polymers of this invention may range from 1:19 to 19:1, respectively.

Certain half-ester monomer(A):monomer(B) polymers have been found to be so deficient in the balance of tack, adhesion and cohesion are so marginal in the properties of quick-stick and adhesion, especially in those polymers having high cohesion that they would have only limited, if any, commercial value as per se pressure-sensitive adhesive polymers. These are polymers of half-ester (A) monomers and (B) monomers having the general formula shown in Section 4 of this disclosure, but in which the $R_5$ groups of the half-ester molecules consist essentially of alkyl groups containing from 1 to 7 carbon atoms. Polymers of these lower alkyl half-esters copolymerized with the monomer(B) acrylates or methacrylates are generally undesirably low in adhesion. Although exhibiting a tack level acceptable for many purposes, the measured probe tack values of these polymers are usually on the low side of the range of tack levels shown for the previously disclosed per se pressure-sensitive adhesive polymers.

The addition of tackifier resins to these polymers results in a surprisingly beneficial improvement in tack and adhesion of the polymer, and in some cases an improvement in creep resistance. Only relatively small amounts of tackifier resin need be added to these polymers to produce an improvement in one or more of these properties. The resin may be added in amounts of about 5 to 50 parts, preferably 5 to 25 parts, per hundred parts of the polymer, on a weight basis. Larger amounts of tackifier resin may be employed, if desired. The tackifier resins suitable for blending with the polymers are conventional resins employed as tackifiers in conventional multi-component rubber/resin pressure-sensitive adhesives.

Table IX sets forth polymers of the lower alkyl maleates and alkyl acrylates. The conditions under which the monomers were batch polymerized in emulsion employing an ammonium persulfate catalyst are also shown. In each case 20 and 80 parts by weight, respectively, of the acid maleate and acrylate were added to the polymerization charge.

TABLE IX

| Ex. | Polymer | | pH of Emulsion | | Temp. of Polymer, °C. |
|---|---|---|---|---|---|
| | Maleate | Acrylate | Monomer | Polymer | |
| 77 | Methyl | (a) | 6.8 | 6.8 | 62–71 |
| 78 | Butyl | Butyl | 6.2 | 4.8 | 60–79 |
| 79 | do | (a) | 6.5 | 6.2 | 61–67 |
| 80 | 2-ethylbutyl | Butyl | 6.2 | 4.8 | 60–80 |
| 81 | do | Hexyl | 6.4 | 6.2 | 62–73 | a A mixture of ethyl acrylate and 2-ethylhexyl acrylate in a 1:4 molar ratio.

The emulsifier in Example 77 was sodium lauryl sulfate (4%) and in Examples 78–81 was Gafac-RE610 (3%). The latter is an anionic emulsifier marketed by Antara Chemicals as a free acid of a complex organic phosphate ester.

Solutions of these polymers and blends of these polymers with various resins were prepared and tapes made therefrom by coating the solutions on polyethyleneterphthalate film. The properties of the tapes are set forth in Table X.

TABLE X

| Adhesive | | Amt. Resin pph. of Polymer | Probe Tack, gms. | Adhesion, 2 min. at 70° F. | Creep, hrs. (160° F.) |
|---|---|---|---|---|---|
| Polymer | Resin | | | | |
| Ex. 77 | | | 410 | 12 | 3.7 |
| Ex. 77 | Durez | 5 | 590 | 22 | 1.9 |
| Ex. 78 | | | 330 | 5 | 2.5 |
| Ex. 78 | Durez | 5 | 820 | 32 | 20.7 |
| Ex. 78 | do | 10 | 1,570 | 43 | 21.0 |
| Ex. 78 | do | 20 | 1,410 | 42 | 24.2 |
| Ex. 78 | Rosin Amine D | 10 | 700 | 11 | 1.6 |
| Ex. 78 | Durez+Rosin Amine D | 5+5 | 660 | 35 | 25.5 |
| Ex. 78 | SP–103 | 10 | 800 | 23 | 6.8 |
| Ex. 78 | BHT | 20 | 660 | 25 | 5.7 |
| Ex. 78 | BHT | 50 | 680 | 27 | 2.9 |
| Ex. 78 | Ester #10 | 20 | 640 | | 0.85 |
| Ex. 79 | | | 560 | | 0.05 |
| Ex. 79 | Durez | 10 | 890 | 46 | 1.64 |
| Ex. 79 | do | 20 | 1,280 | 47 | 1.07 |
| Ex. 80 | | | 500 | 5 | 2.2 |
| Ex. 80 | Durez | 10 | 680 | 25 | 2.5 |
| Ex. 80 | Rosin Amine D | 10 | 750 | | 11.4 |
| Ex. 80 | Ester #10 | 20 | 720 | 21 | 4.3 |
| Ex. 81 | | | | | 0.01 |
| Ex. 81 | Durez | 10 | 400 | 16 | 0.05 |
| Ex. 81 | Durez+Rosin Amine D | 10+10 | 790 | | 0.05 |

The Durez resin and the Ester #10 resin were the resins described elsewhere in this disclosure as Durez 19900 and staybelite Ester #10. The BHT is the bicycloheptadiene:terpene resin also disclosed herein. The Rosin Amine D is a technical grade of dehydroabietylamine marketed by Hercules Powder Co., Inc. The SP–103 resin is a heat advancing phenolformaldehyde resin marketed by Schenectady Chemical Company.

At least 50% of the alcohols from which the $C_1$–$C_7$ half-ester monomer(A) composition may be made are non-tertiary alcohols. Branched alkyl alcohols other than tertiary alcohols are preferred. The half-ester monomer(A) may consist of an ester of a single alkyl alcohol or a mixture of different alkyl alcohols. In the case of the half-esters prepared from a mixture of different size alkyl alcohols, the number of carbon atoms in alkyl groups of the half-esters is, of course, an average number. The half-ester monomer(A) component may consist of a mixture of alkyl half-esters containing less than eight carbon atoms in the alkyl groups thereof. The mixture may also contain alkyl half-esters containing more than seven carbon atoms in the alkyl groups, the average of all of which is less than eight carbon atoms. The balance of tack, adhesion and cohesion of these polymers improves as the complexity of the mixture of half-esters increases. From the foregoing description and examples of monomer(A) complexity and the effect thereof on the balance of tack, adhesion and cohesion of the per se pressure-sensitive adhesive polymers, it will be appreciated that the number of polymers capable of being used as pressure-sensitive adhesives by themselves increases as the average number of carbon atoms in the alkyl groups of the half-ester component approaches about eight by mixing higher ($C_8$ and above), branched alkyl half-esters with the lower ($C_1$–$C_7$) alkyl half-esters.

The average number of carbon atoms in the $R_2$ groups of monomer(B) may range from 1 to 14, averaging from 3 to 13 carbon atoms in the case of the acrylate monomer(B) and from 4 to 14 in the case of the methacrylate monomer(B). The proportion range of these lower alkyl half-ester (A) monomers and acrylate (B) monomers is from 1:19 to 7:3, by weight. The proportion range in the case of the methacrylate (B) monomer is from 1:19 to 3:2, by weight. In either case the mol ratio of (A):(B) should not exceed 1:1 and preferably should not exceed 1:2 when the (B) monomer is all methacrylate.

Several routes are available by which the polymers of this invention may be prepared. For example, the (B) monomers and the anhydride of the dicarboxylic acid may be copolymerized, followed by amidation of the anhydride/ester polymer. The polymer can be formed by copolymerizing monomer(A) and monomer(B) in solution of an inert solvent in addition to the aqueous emulsion techniques specifically shown. The preferred method for producing the polymers of this invention is the emulsion polymerization process, using a redox system of catalysts. The polymerization can be conducted as a continuous process as well as a batch operation.

Various types of catalysts useful in the polymerization of acrylate and methacrylate monomers may be employed in the production of the polymers of this invention. Examples of peroxide-type, free radical polymerization initiators are inorganic peroxides such as hydrogen peroxide and barium peroxide; organic peroxides such as dicumyl peroxide, ditertiary butyl peroxide, cumyl hydrogen peroxide, diacetyl peroxide and dibenzoyl peroxide; and inorganic peracids, such as ammonium persulfate, potassium persulfate, and potassium percarbonate. These initiators can be used alone, or preferably, in the presence of reducing agents such as ferrous salts, cuprous, bisulfite, thiosulfate, hydrosulfite and tetrathionate salts, dimethylaniline, triethanolamine, and alkylene polyamines. Other types of initiating systems may be used for the preparation of these polymers, for example, ultra-violet light in the presence of organic peroxides or photosensitizers such as benzophenone.

As is well known in the art of polymerization, the choice of catalysts depends upon many factors. The type of monomers to be polymerized and the type of polymerization, whether solution, bulk or emulsion, determine the choice of catalyst. In the case of emulsion polymerization, the pH of the emulsion, the type of the emulsifier and the temperature of the emulsion also will influence the choice of catalysts. In general, the amounts of the initiators used in the preferred emulsion polymerization system may vary from as low as 0.1 or lower to about 2 parts per 100 parts of monomers.

Various types of emulsifiers can be used. The types of emulsifiers used in emulsion polymerizations are the anionic, nonionic and cationic emulsifiers Emulsifiers of these groups commonly used in acrylate and methacrylate emulsion polymerization systems have been employed with success in the present case, as illustrated in the examples. The emulsion polymer can be used as such, thickened with thickening agents, such as polyvinyl alcohol, water soluble polyacrylates, water soluble cellulosic derivatives, etc. The polymer can be separated from the polymerization medium by coagulation with acids, salts, or by freezing. The resulting coagulum may then be washed and dried.

Two methods of testing for tack were used. One method employed an Instron machine and the values obtained with this machine have been referred to herein as the "Instron tack values." The other and preferred method employs an apparatus described in copending U.S. patent application Serial No. 234,098, filed on October 30, 1962, now U.S. Patent No. 3,214,971, issued November 2, 1965; this method is referred to herein simply as the "probe tack test" and the values measured by this method are referred to as the "probe tack" or the "probe tack values."

The apparatus used in the probe tack test consists of four functional parts: (1) a cylindrical steel probe having a diameter of ¼" attached to the compression loaded spring of (2) a Series L Hunter Mechanical Force Gage (Hunter Spring Company, Brochure 750/FG, revised February 1961), (3) an annulus having an opening slightly larger than the diameter of the probe and (4) a carrier for the annulus which moves down to bring the annulus around the probe and then up to remove the annulus therefrom. The carrier moves at a speed of 0.1" per second.

At the beginning of the test the carrier is at its uppermost point of travel, the annulus rests upon the carrier. The annulus is positioned on the carrier so that the opening in the annulus is in line with the probe positioned beneath it. A strip of tape is placed upon the annulus, adhesive surface down, and spanning the annulus opening. As the carrier is driven downwardly by a synchronous motor, the adhesive surface exposed through the opening is brought into contact with the flat surface of the probe. The tape, and the annulus attached thereto, is suspended on the probe as the carrier continues further on its downward path. The carrier then reverses its movement, returning to pick up the annulus, thereby separating the tape from the probe surface. Separation begins after one second contact between the probe and adhesive. The force required to separate the tape from the probe is recorded on the force gauge. The recorded value is the probe tack value. The weight of the annulus is such to provide a contact pressure between the probe and adhesive surface of one pound per square inch.

In conducting the Instron test a strip of the adhesive tape is held flat in a perforated adhesive tape holder. The surface of the adhesive is exposed through the perforation. The tape holder and the tape are attached to the cross head of an Instron machine. A machined and polished brass probe having a diameter of ⁹⁄₃₂" is held in the jaws of the Instron and is brought into contact with the exposed surface of the adhesive at a pressure of 1.0 p.s.i. over the contact area. After a two second contact between the probe and the adhesive, the probe is removed and the force required to remove the probe is recorded by the Instron machine. The recorded force is the Instron tack value.

The peel adhesion values are the forces required to remove an adhesive tape from a stainless steel surface after contact therewith for 16 hours at a temperature of about 70° F. The tape was stripped from the surface at a 180° angle. A one inch wide tape is used in the test.

The creep resistance test is designed to test the resistance of the adhesive coating to shearing within the plane of the adhesive coating. A one inch strip of tape is applied to a vertical stainless steel surface. The surface is heated to the desired temperature. A 1 kg. weight is hung from the bottom end of the tape, which hangs freely from the metal surface. The failure time is that time at which the tape falls from the stainless steel surface under the stress applied by the 1 kg. weight.

The invention claimed is:

1. An adhesive tape comprising a flexible backing and supported thereon a pressure-sensitive adhesive polymer of monomers consisting essentially of:

(A) at least one monomer selected from the group consisting of monomers the molecules of which have the structure

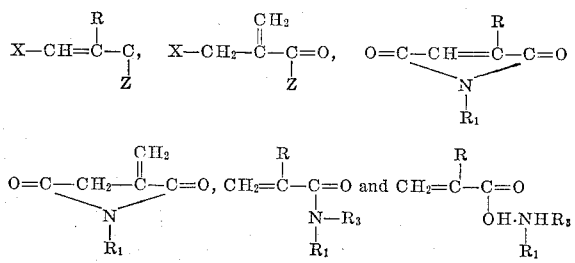

and (B) at least one ester monomer selected from the group consisting of monomers the molecules of which have the structure

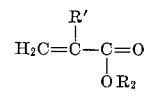

in which monomer molecules:
(1) R and R′ are selected from the group consisting of hydrogen and methyl groups;
(2) X is selected from the group consisting of

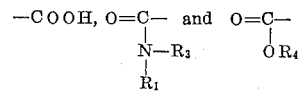

(3) Z is selected from the group consisting of

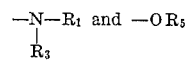

X being —COOH when Z is $OR_5$;
(4) the $R_1$ groups of the monomer(A) molecules are selected from alkyl groups containing up to and including about 28 carbon atoms, the average number of carbon atoms of the selected alkyl groups being no greater than about 24, the alkyl groups selected which contain more than about 6 carbon atoms consisting essentially of branched alkyl groups in which the extent of branching increases as the size of said alkyl groups selected increases, said molecules consisting of a mixture of molecules containing different alkyl groups when said molecules contain alkyl groups having more than about 10 carbon atoms, the number of molecules containing different alkyl groups increasing in said mixtures as the size of the alkyl groups which contain more than about 10 carbon atoms increases;

(5) the $R_2$ groups of the ester monomer(B) molecules are selected from alkyl groups containing up to and including about 14 carbon atoms, the average number of carbon atoms of the selected alkyl groups being no greater than about 14, at least about 50% of the ester monomer molecules having the $R_2$ groups attached at non-tertiary carbon atoms to the oxygen atom;

(6) the $R_3$ groups of the monomer(A) molecules are selected from the class consisting of hydrogen and alkyl groups containing up to and including about 10 carbon atoms, the alkyl groups selected which contain more than about 6 carbon atoms consisting essentially of branched alkyl groups;

(7) the $R_4$ groups of the monomer(A) molecules are selected from alkyl groups containing up to and including 18 carbon atoms, the alkyl groups selected which contain more than about 8 carbon atoms consisting essentially of branched alkyl groups; and (8) the $R_5$ groups of the monomer(A) molecules are selected from alkyl groups containing up to and including about 24 carbon atoms, said monomer(A) molecules containing $R_5$ groups consisting of a mixture of molecules containing different alkyl groups in which the average number of carbon atoms of the alkyl groups is from about 8–18, the alkyl groups selected which contain more than about 7 carbon atoms consisting essentially of branched alkyl groups in which the extent of branching increases as the size of the alkyl groups increases and in which mixture the number of different alkyl groups selected increases as the size of the alkyl groups increases, at least about 50% of said monomer(A) molecules of this paragraph (8) having the $R_5$ groups attached at non-tertiary carbon atoms to the oxygen atom; the proportion, by weight, of monomer(A) to ester monomer(B) which is combined in said polymer being within the range of 1:19 to 7:3, but not exceeding a mol ratio of 1:1, the proportion, the size and extent of branching of said $R_1$, $R_2$, $R_3$, $R_4$ and $R_5$ groups and the extent to which each of said monomers consists of mixtures of different molecules being interdependent.

2. A pressure-sensitive tape comprising a flexible backing and supported thereon a pressure-sensitive adhesive polymer of monomers consisting essentially of:

(A) a mixture of half-esters of at least one acid selected from the group consisting of maleic acid, fumaric acid, citraconic acid and itaconic acid and a mixture of alcohols selected from alcohols of the group consisting of $C_1$ to $C_{24}$ alkyl alcohols, at least 50% of the alcohols selected consisting of non-tertiary alkyl alcohols, the average number of carbon atoms of the alkyl groups of the selected alcohols of said mixture being from about 8–18, the alcohols selected which contain more than 7 carbon atoms in the alkyl groups thereof consisting essentially of branched alkyl alcohols in which mixture the number of different alcohols selected increases as the size of the alkyl groups of said alcohol increases; and (B) at least one ester selected from the class consisting of esters of at least one acid selected from the group consisting of acrylic and methacrylic acids and at least one alcohol selected from alcohols of the group consisting of $C_1$ to $C_{14}$ alkyl alcohols, at least 50% of the alcohols selected consisting of non-tertiary alkyl alcohols, the average number of carbon atoms of the alkyl groups of the selected alcohols being no greater than 14; the proportion, by weight, of half-ester monomer(A) to ester monomer(B) which is combined in said polymer being within the range of 1:19 to 7:3, but not exceeding a mol ratio of 1:1; said proportion, the size and extent of branching of the alkyl groups of both monomer(A) and (B) and the extent to which each of the monomers consists of mixtures of esters of different alcohols being interdependent.

3. An adhesive tape in accordance with claim 2 wherein the ester monomer(B) combined in said polymer consists of esters of methacrylic acid and at least one alkyl alcohol selected from non-tertiary alkyl alcohols of the group consisting of $C_1$ to $C_{14}$ alkyl alcohols, the number of carbon atoms of the alkyl groups of the selected alcohols being from about 4 to 14 and wherein the proportion, by weight, of half-ester monomer(A) ester monomer(B) which is combined in said polymer being within the range of 1:19 to 3:2, but not exceeding the mol ratio of 1:2.

4. An adhesive tape in accordance with claim 2 wherein the ester monomer(B) combined in said polymer consists of esters of acrylic acid and at least one alkyl alcohol selected from alcohols of the group consisting of $C_1$ to $C_{14}$ alkyl alcohols, at least 50% of the alcohols selected consisting of non-tertiary alkyl alcohols, and the average number of the carbon atoms of the alkyl groups of the selected alcohols being no greater than about 13 and wherein the proportion, by weight, of half-ester monomer(A) to ester monomer(B) which is combined in said polymer is within the range of 1:19 to 7:3, but not exceeding a mol ratio of 1:1.

5. An adhesive tape comprising a flexible backing and supported thereon a pressure-sensitive adhesive polymer of monomers consisting essentially of:

(A) at least one amide monomer selected from the group consisting of monomers the molecules of which have the structure

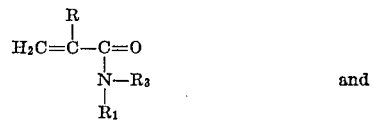 and (B) at least one ester monomer selected from the group consisting of monomers the molecules of which have the structure

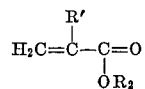

in which monomer molecules:

(1) R and R' are selected from the class consisting of hydrogen and methyl groups;

(2) the $R_1$ groups of the amide monomer(A) molecules are selected from alkyl groups containing up to and including about 28 carbon atoms, the average number of carbon atoms of the selected alkyl groups being from about 6 to 24, the alkyl groups selected which contain more than about 6 carbon atoms consisting essentially of branched alkyl groups in which the extent of branching increases as the size of said alkyl groups selected increases, said molecules consisting of a mixture of molecules containing different alkyl groups when said molecules contain alkyl groups having more than about 10 carbon atoms, the number of molecules containing different alkyl groups increasing in said mixtures as the size of the alkyl groups which contain more than about 10 carbon atoms increases;

(3) the $R_2$ groups of the ester monomer(B) molecules are selected from alkyl groups containing up to and including about 14 carbon atoms, the average number of carbon atoms of the selected alkyl groups being no greater than about 13, at least about 50% of the ester monomer molecules having the $R_2$ groups attached at non-tertiary carbon atoms to oxygen atoms of said molecules; and (4) the $R_3$ groups of the amide monomer(A) molecules are selected from the class consisting of hydrogen and alkyl groups containing up to and including about 10 carbon atoms, the alkyl groups selected which contain more than about 6 carbon atoms consisting essentially of branched alkyl groups; the proportion, by weight, of amide monomer(A) to ester monomer(B) which is combined in said polymer being within the range of 1:19 to 3:1, but not exceeding a mol ratio of 1:1, the proportion, the size and extent of branching of said $R_1$, $R_2$ and $R_3$ groups and the extent to which each of the monomers consists of mixtures of different molecules being interdependent.

6. An adhesive tape in accordance with claim 5 wherein the monomer(B) molecules combined in said polymer is at least one ester monomer selected from the group consisting of monomers the molecules of which have the structure

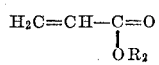

in which monomer molecules the $R_2$ groups are selected from alkyl groups containing up to and including about 14 carbon atoms, the average number of carbon atoms of the selected alkyl groups being no greater than about 13, at least about 50% of the ester monomer molecules having the $R_2$ groups attached at non-tertiary carbon atoms to the oxygen atoms of said molecules and wherein the proportion, by weight, of amide monomer(A) to ester monomer(B) which is combined in said polymer being within the range of 1:19 to 3:1, but not exceeding a mol ratio of 1:1.

7. An adhesive tape comprising a flexible backing and supported thereon a pressure-sensitive adhesive polymer of monomers consisting essentially of:

(A) at least one monomer selected from the group consisting of monomers the molecules of which have the structure

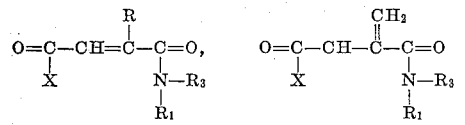

and 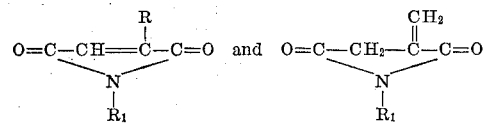

and
(B) at least one ester monomer selected from the group consisting of monomers the molecules of which have the structure

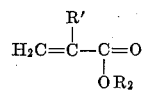

in which monomer molecules:
(1) R and R' are selected from the class consisting of hydrogen and methyl groups;
(2) the X groups are at least one member selected from the group consisting of

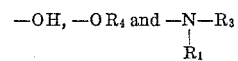

(3) the $R_1$ groups of the monomer(A) molecules are selected from alkyl groups containing up to and including about 28 carbon atoms, the average number of carbon atoms of the selected alkyl groups being no greater than about 24, the alkyl groups selected which contain more than about 6 carbon atoms consisting essentially of branched alkyl groups in which the extent of branching increases as the size of said alkyl groups selected increases, said molecules consisting of a mixture of molecules containing different alkyl groups when said molecules contain alkyl groups having more than about 10 carbon atoms, the number of molecules containing different alkyl groups increasing in said mixtures as the size of the alkyl groups which contain more than about 10 carbon atoms increases;

(4) the $R_2$ groups of the ester monomer(B) molecules are selected from alkyl groups containing up to and including about 14 carbon atoms, the average number of carbon atoms of the selected alkyl groups being no greater than about 13, at least about 50% of the ester monomer molecules having the $R_2$ groups attached at non-tertiary carbon atoms to the oxygen atom;

(5) the $R_3$ groups of the monomer(A) molecules are selected from the class consisting of hydrogen and alkyl groups containing up to and including about 10 carbon atoms, the alkyl groups selected which contain more than about 6 carbon atoms consisting essentially of branched alkyl groups; and (6) the $R_4$ groups of the monomer(A) molecules are selected from alkyl groups containing up to and including 18 carbon atoms, the alkyl groups selected which contain more than about 8 carbon atoms consisting essentially of branched alkyl groups;

the proportion, by weight, of monomer(A) to ester monomer(B) which is combined in said polymer being within the range of 1:19 to 7:3, but not exceeding a mol ratio of 1:1, the proportion, the size and extent of branching of said $R_1$, $R_2$, $R_3$ and $R_4$ groups and the extent to which each of said monomers consists of mixtures of different molecules being interdependent.

8. An adhesive tape comprising a flexible backing and supported thereon a pressure-sensitive adhesive polymer of monomers consisting essentially of:
(A) at least one monomer selected from the group consisting of monomers the molecules of which have the structure

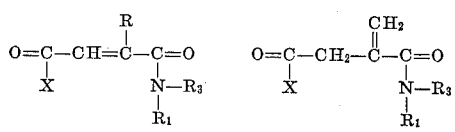

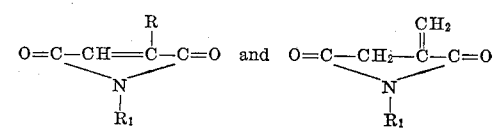

(B) an ester monomer the molecules of which have the structure

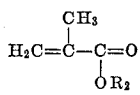

in which monomer molecules:
(1) the R groups are selected from the class consisting of hydrogen and methyl groups;
(2) the X groups are at least one member selected from the group consisting of

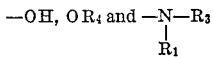

(3) the $R_1$ groups of the monomer(A) molecules are selected from alkyl groups containing up to and including about 28 carbon atoms, the average number of carbon atoms of the selected alkyl groups being no greater than about 24, the alkyl groups selected which contain more than 6 carbon atoms consisting essentially of branched alkyl groups in which the extent of branching increases as the size of said alkyl groups selected increases, said molecules consisting of a mixture of molecules containing different alkyl groups when said molecules contain alkyl groups having more than about 10 carbon atoms, the number of molecules containing different alkyl groups increasing in said mixtures as the size of the alkyl groups which contain more than about 10 carbon atoms increases;
(4) the $R_2$ groups of the ester monomer(B) molecules are selected from alkyl groups containing up to and including about 14 carbon atoms, the average number of carbon atoms of the selected alkyl groups being from 4 to about 13, the $R_2$ groups being attached at non-tertiary carbon atoms to the oxygen atom;
(5) the $R_3$ groups of the monomer(A) molecules are selected from the class consisting of hydrogen and alkyl groups containing up to and including about 10 carbon atoms, the alkyl groups selected which contain more than about 6 carbon atoms consisting essentially of branched alkyl groups; and
(6) the $R_4$ groups of the monomer(A) molecules are selected from alkyl groups containing up to and including 18 carbon atoms, the alkyl groups selected which contain more than about 8 carbon atoms consisting essentially of branched alkyl groups;
 the proportion, by weight, of monomer(A) to ester monomer(B) which is combined in said polymer being within the range of 1:19 to 3:2, but not exceeding a mol ratio of 1:2;
 the proportion, the size and extent of branching of said $R_1$, $R_2$, $R_3$ and $R_4$ groups and the extent to which each of said monomers consists of mixtures of different molecules being interdependent.

9. An adhesive tape comprising a flexible backing and supported thereon a pressure-sensitive adhesive polymer of monomers consisting essentially of:
(A) at least one monomer selected from the group consisting of monomers the molecules of which have the structure

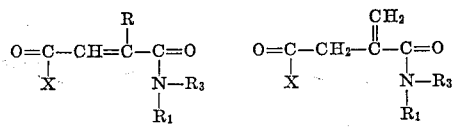

and

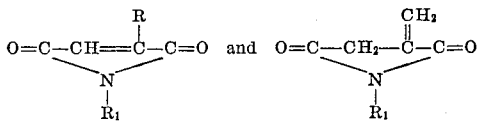

and
(B) an ester monomer the molecules of which have the structure

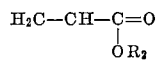

in which monomer molecules:
(1) the R groups are selected from the class consisting of hydrogen and methyl groups;
(2) the X groups are at least one member selected from the group consisting of

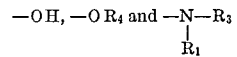

(3) the $R_1$ groups of the monomer(A) molecules are selected from alkyl groups containing up to and including about 28 carbon atoms, the average number of carbon atoms of the selected alkyl groups being no greater than about 24, the alkyl groups selected which contain more than about 6 carbon atoms consisting essentially of branched alkyl groups in which the extent of branching increases as the size of said alkyl groups selected increases, said molecules consisting of a mixture of molecules containing different alkyl groups when said molecules contain alkyl groups having more than about 10 carbon atoms, the number of molecules containing different alkyl groups increasing in said mixtures as the size of the alkyl groups which contain more than about 10 carbon atoms increases;
(4) the $R_2$ groups of the ester monomer(B) molecules are selected from alkyl groups containing up to and including about 14 carbon atoms, the average number of carbon atoms of the selected alkyl groups being no greater than about 13, at least about 50% of the ester monomer molecules having the $R_2$ groups attached at non-tertiary carbon atoms to the oxygen atom;
(5) The $R_3$ groups of the monomer(A) molecules are selected from the class consisting of hydrogen and alkyl groups containing up to and including about 10 carbon atoms, the alkyl groups selected which contain more than about 6 carbon atoms consisting essentially of branched alkyl groups; and
(6) the $R_4$ groups of the monomer(A) molecules are selected from alkyl groups containing up to and including 18 carbon atoms, the alkyl groups selected which contain more than about 8 carbon atoms consisting essentially of branched alkyl groups; the proportion, by weight, of monomer(A) to ester monomer(B) which is combined in said polymer being within the range of 1:19 to 7:3, but not exceeding a mol ratio of 1:1, the proportion, the size and extent of branching of said $R_1$, $R_2$, $R_3$ and $R_4$ groups and the extent to which each of said monomers consists of mixtures of different molecules being interdependent.

10. An adhesive tape comprising a flexible backing and supported thereon a pressure-sensitive adhesive polymer of monomers consisting essentially of:
(A) at least one monomer selected from the group consisting of monomers the molecules of which have the structure

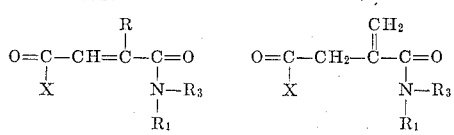

and

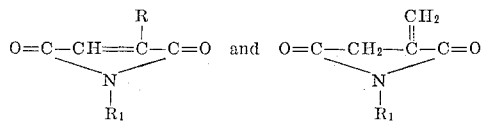

and
(B) an ester monomer the molecules of which have the structure

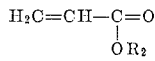

in which monomer molecules:
(1) the R groups are selected from the class consisting of hydrogen and methyl groups;
(2) the X groups are at least one member selected from the group consisting of

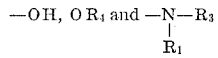

(3) the $R_1$ groups of the monomer(A) molecules are selected from tertiary alkyl groups containing up to and including about 28 carbon atoms, said monomer(A) molecules consisting of a mixture of molecules containing different alkyl groups in which the average number of carbon atoms of the selected alkyl groups is from about 8 to about 24, the alkyl groups selected which contain more than about 6 carbon atoms consisting essentially of branched alkyl groups in which the extent of branching increases as the size of said alkyl groups selected increases, the number of molecules containing different alkyl groups increasing in said mixtures as the size of the alkyl groups increases the $R_1$ groups being attached to tertiary carbon atoms to the introgen atoms of said molecules;
(4) the $R_2$ groups of the ester monomer(B) molecules are selected from alkyl groups containing up to and including about 14 carbon atoms, the average number of carbon atoms of the selected alkyl groups being no greater than about 13, the $R_2$ groups being attached at non-tertiary carbon atoms to the oxygen atoms of said molecules;
(5) the $R_3$ groups of the monomer(A) molecules are selected from the class consisting of hydrogen and alkyl groups containing up to and including about 10 carbon atoms, the alkyl groups selected which contain more than about 6 carbon atoms consisting essentially of branched alkyl groups; and
(6) the $R_4$ groups of the monomer(A) molecules are selected from alkyl groups containing up to and including 18 carbon atoms, the alkyl groups selected which contain more than about 8 carbon atoms consisting essentially of branched alkyl groups; the proportion, by weight, of monomer(A) to ester monomer(B) which is combined in said polymer being within the range of 1.19 to 7:3, but not exceeding a mol ratio of 1:1, the proportion, the size and extent of branching of said $R_1$, $R_2$, $R_3$ and $R_4$ groups and the extent to which each of said monomers consists of mixtures of different molecules being interdependent.

11. An adhesive tape comprising a flexible backing and supported thereon a pressure-sensitive adhesive polymer of monomers consisting essentially of:
(A) a monomer the molecules of which have the structure

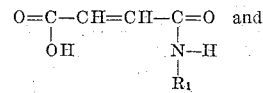

(B) an ester monomer the molecules of which have the structure

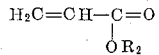

in which monomer molecules:
(1) the $R_1$ groups of the monomer(A) molecules are selected from alkyl groups containing up to and including about 28 carbon atoms, the average number of carbon atoms of the selected alkyl groups being no greater than about 24, the alkyl groups selected which contain more than about 6 carbon atoms consisting essentially of branched alkyl groups in which the extent of branching increases as the size of said alkyl groups selected increases, said molecules consisting of a mixture of molecules containing different alkyl groups when said molecules contain alkyl groups having more than about 10 carbon atoms, the number of molecules containing different alkyl groups increasing in said mixtures as the size of the alkyl groups which contain more than about 10 carbon atoms increases, and
(2) the $R_2$ groups of the ester monomer(B) molecules are selected from alkyl groups containing up to and including about 14 carbon atoms, the average number of carbon atoms of the selected alkyl groups being no greater than about 13, the $R_2$ groups being attached at non-tertiary carbon atoms to the oxygen atom; the proportion, by weight, of monomer(A) to ester monomer(B) which is combined in said polymer being within the range of 1:19 to 7:3, but not exceeding a mol ratio of 1:1, the proportion, the size and extent of branching of said $R_1$ and $R_2$ groups and the extent to which each of said monomers consists of mixtures of different molecules being interdependent.

12. An adhesive tape in accordance with claim 11 wherein said monomer (A) combined in said polymer consists of a mixture of said molecules containing different alkyl groups, the average number of carbon atoms of the alkyl groups being from about 8 to about 24.

13. An adhesive tape comprising a flexible backing and supported thereon a pressure-sensitive adhesive polymer of monomers consisting essentially of:
(A) N-alkyl maleamic acids of a mixture of alkyl primary amines containing up to and including about 28 carbon atoms in the alkyl groups thereof and averaging no greater than about 24 carbon atoms in said alkyl groups, said mixture consisting essentially of different amines selected from the group consisting of N-t-1,1,3,3-tetramethylbutyl, N-t-1,1,3,3,5,5-hexamethylhexyl, N-t-1,1,3,3,5,5,7,7-octamethyloctyl, N-t-1,1,3,3,5,5,7,7,9,9-decamethyldecyl, and N-t-1,1,3,3,5,5,7,7,9,9,11,11 - dodecamethyldodecyl amines, and
(B) acrylates of non-tertiary alcohols containing up to and including about 14 carbon atoms in the alkyl groups thereof and averaging no greater than about 13 carbon atoms in said alkyl groups;
the proportion, by weight, of monomer (A) to monomer (B) which is combined in said polymer being within the range of 1:19 to 7:3, but not exceeding a mol ratio of 1:1;

the proportion within said range, the size and extent of branching of the alkyl groups of said monomers and the extent to which each of said monomers consists of mixtures of monomers containing different alkyl groups being interdependent.

14. An adhesive tape comprising a flexible backing and a pressure-sensitive adhesive polymer in accordance with claim 1 wherein a monomer (C) having an ethylenic grouping therein copolymerizable with monomers (A) and (B) is combined with monomers (A) and (B) in said polymer in an amount up to about 50% by weight of monomers (A) and (B).

15. A pressure-sensitive adhesive polymer of monomers consisting essentially of:

(A) at least one monomer selected from the group consisting of monomers the molecules of which have the structure

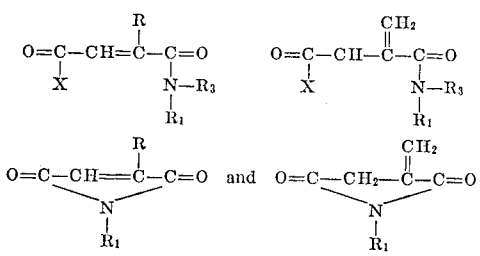

(B) at least one ester monomer selected from the group consisting of monomers the molecules of which have the structure

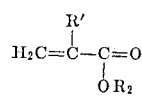

in which monomer molecules:
(1) R and R' are selected from the class consisting of hydrogen and methyl groups;
(2) the X groups are at least one member selected from the group consisting of

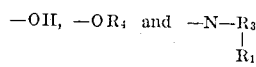

(3) The $R_1$ groups of the monomer (A) molecules are selected from alkyl groups containing up to and including about 28 carbon atoms, said monomer (A) molecules consisting of mixture of molecules containing different alkyl groups in which the average number of carbon atoms of the selected alkyl groups is from about 8 to about 24, the alkyl groups selected which contain more than about 6 carbon atoms consisting essentially of branched alkyl groups in which the extent of branching increases as the size of said alkyl groups selected increases, the number of molecules containing different alkyl groups increasing in said mixtures as the size of the alkyl groups increases;
(4) the $R_2$ groups of the ester monomer (B) molecules are selected from alkyl groups containing up to and including about 14 carbon atoms, the average number of carbon atoms of the selected alkyl groups being no greater than about 13, at least about 50% of the ester monomer molecules having the $R_2$ groups attached at non-tertiary carbon atoms to the oxygen atom;
(5) the $R_3$ groups of the monomer (A) molecules are selected from the class consisting of hydrogen and alkyl groups containing up to and including about 10 carbon atoms, the alkyl groups selected which contain more than about 6 carbon atoms consisting essentially of branched alkyl groups; and
(6) the $R_4$ groups of the monomer (A) molecules are selected from alkyl groups containing up to and including 18 carbon atoms, the alkyl groups selected which contain more than about 8 carbon atoms consisting essentially of branched alkyl groups;
 the proportion, by weight, of monomer (A) to ester monomer (B) which is combined in said polymer being within the range of 1:19 to 7:3, but not exceeding the mol ratio of 1:1;
 the proportion, the size and extent of branching of said $R_1$, $R_2$, $R_3$ and $R_4$ groups and the extent to which each of said monomers consists of mixtures of different molecules being interdependent.

16. An adhesive tape comprising a flexible backing and supported thereon a pressure-sensitive adhesive polymer of monomers consisting essentially of:

(A) at least one amide monomer selected from the group consisting of monomers the molecules of which have the structure

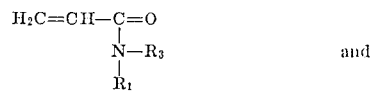 and (B) at least one ester monomer selected from the group consisting of monomers the molecules of which have the structure

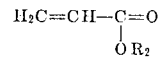

in which monomer molecules:
(1) the $R_1$ groups of the amide monomer (A) molecules are selected from alkyl groups containing up to and including about 28 carbon atoms, the average number of carbon atoms of the selected alkyl groups from about 6 to 24, the alkyl groups selected which contain more than about 6 carbon atoms consisting essentially of branched allyl groups in which the extent of branching increases as the size of said alkyl groups selected increases, said molecules consisting of a mixture of molecules containing different alkyl groups when said molecules contain alkyl groups having more than about 10 carbon atoms, the number of molecules containing different alkyl groups increasing in said mixtures as the size of the alkyl groups which contain more than about 10 carbon atoms increases;
(2) the $R_2$ groups of the ester monomer (B) molecules are selected from alkyl groups containing up to and including about 14 carbon atoms, the average number of carbon atoms of the selected alkyl groups being no greater than about 13, the $R_2$ groups being attached at non-tertiary carbon atoms to oxygen atoms of said molecules; and
(3) the $R_3$ groups of the amide monomer (A) molecules are selected from the class consisting of hydrogen and alkyl groups containing up to and including about 10 carbon atoms, the alkyl groups selected which contain more than about 6 carbon atoms consisting essentially of branched alkyl groups; the proportion, by weight, of amide monomer (A) to ester monomer (B) which is combined in said polymer being within the range of 1:19 to 3:1, but not exceeding a mol ratio of 1:1, the proportion, the size and extent of branching of said $R_1$, $R_2$ and $R_3$ groups and the extent to which each of the monomers consists of mixtures of different molecules being interdependent.

17. An adhesive tape in accordance with claim 16 wherein amide monomer (A) molecules combined in said polymer consist of a mixture of molecules in which the $R_1$ alkyl groups average from about 11 to 24 carbon atoms and $R_3$ is hydrogen monomer (B) molecules combined in said polymer consist of molecules in which the $R_2$ alkyl groups average from about 3 to 13 carbon atoms.

18. An adhesive tape in accordance with claim 16 wherein:
   amide monomer (A) molecules combined in said polymer consist of molecules in which the $R_1$ alkyl groups average from about 6 to 10 carbon atoms and $R_3$ is hydrogen; and
   ester monomer (B) molecules combined in said polymer consist of molecules in which the $R_2$ groups average 3 to 13 carbon atoms; and
   said proportion of amide monomer (A) to ester monomer (B) in said polymer is within the range of from 1:19 to 1:1.

19. An adhesive tape in accordance with claim 16 wherein amide monomer (A) molecules combined in said polymer consist essentially of amides of acrylic acid and a mixture of alkyl amines selected from the group consisting of t-butyl amine; 1,1,3,3-tetramethyl-butyl amine; 1,1,3,3,5,5-hexamethylhexyl amine; 1,1,3,3,5,5,7,7-octamethyloctyl amine; 1,1,3,3,5,5,7,7,9,9-decamethyldecyl amine; and 1,1,3,3,5,5,7,7,9,9,11,11-dodecamethyldedecyl amine; and $R_3$ is hydrogen.

20. An adhesive tape comprising a flexible backing and supported thereon a pressure-sensitive adhesive polymer of monomers consisting essentially of:
   (A) at least one monomer selected from the group consisting of monomers the molecules of which have the structure

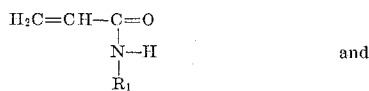

and (B) at least one ester monomer selected from the group consisting of monomers the molecules of which have the structure

in which monomer molecules:
      (1) the $R_2$ groups of the amide monomer (A) molecules are selected from tertiary alkyl groups containing up to and including about 28 carbon atoms, said amide monomer (A) molecules consisting of a mixture of molecules containing different alkyl groups in which the average number of carbon atoms of the selected alkyl groups is from about 11 to 24, the alkyl groups selected which contain more than about 6 carbon atoms consisting essentially of branched alkyl groups in which the extent of branching increases as the size of said alkyl groups selected increases, the number of molecules containing different alkyl groups increasing in said mixtures as the size of the alkyl groups which contain more than about 10 carbon atoms increases, the $R_1$ groups being attached at tertiary carbon atoms to the nitrogen atoms of said molecules;
      (2) the $R_2$ groups of the ester monomer (B) molecules are selected from alkyl groups containing up to and including about 14 carbon atoms, the average number of carbon atoms of the selected alkyl groups being from about 6 to 14, the $R_2$ groups being attached at non-tertiary carbon atoms to the oxygen atoms of said molecules; and
      (3) the proportion, by weight, of monomer (A) to ester monomer (B) which is combined in said polymer being within the range of 1:9 to 3:2, but not exceeding a mol ratio of 1:2, the proportion, the size and extent of branching of said $R_1$ and $R_2$ groups and the extent to which each of the monomers consists of mixtures of different molecules being interdependent.

21. An adhesive tape comprising a flexible backing and supported thereon a pressure-sensitive adhesive polymer of monomers consisting essentially of:
   (A) at least one amide monomer selected from the group consisting of monomers the molecules of which have the structure

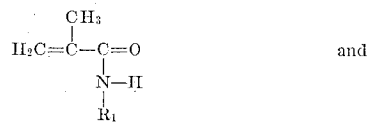

and (B) at least one ester monomer selected from the group consisting of monomers the molecules of which have the structure

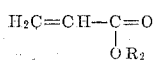

in which monomer molecules:
      (1) the $R_1$ groups of the amide monomer (A) molecules are selected from tertiary alkyl groups containing up to and including about 28 carbon atoms, said amide monomer (A) molecules consisting of a mixture of molecules containing different alkyl groups in which the average number of carbon atoms of the selected alkyl groups is from about 8 to 24, the alkyl groups selected which contain more than about 6 carbon atoms consisting essentially of branched alkyl groups in which the extent of branching increases as the size of said alkyl groups selected increases, the number of molecules containing different alkyl groups increasing in said mixtures as the size of the alkyl groups which contain more than about 10 carbon atoms increases, the $R_1$ groups being attached at tertiary carbon atoms to the nitrogen atoms of said molecules;
      (2) The $R_2$ groups of the ester monomer (B) molecules are selected from alkyl groups containing up to and including about 14 carbon atoms, the average number of carbon atoms of the selected alkyl groups being from about 3 to about 13, the $R_2$ groups being attached at non-tertiary carbon atoms to oxygen atoms of said molecules;
         the proportion, by weight, of amide monomer (A) to ester monomer (B) which is combined in said polymer being within the range of 1:19 to 3:1, but not exceeding a mol ratio of 1:1;
         the proportion, the size and extent of branching of said $R_2$ and $R_2$ groups and the extent to which each of the monomers consists of mixtures of different molecules being interdependent.

22. An adhesive tape comprising a flexible backing and supported thereon a pressure-sensitive adhesive polymer of monomers consisting essentially of:
   (A) at least one monomer selected from the group consisting of monomers the molecules of which have the structure

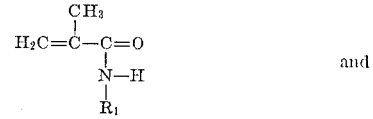

and (B) at least one ester monomer selected from the group consisting of monomers the molecules of which have the structure

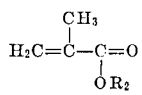

in which monomer molecules:
(1) the $R_1$ groups of the amide monomer (A) molecules are selected from tertiary alkyl groups containing up to and including about 28 carbon atoms, said amide monomer (A) molecules consisting of a mixture of molecules containing different alkyl groups in which the average number of carbon atoms of the selected alkyl groups is from about 11 to 24, the alkyl groups selected which contain more than about 6 carbon atoms consisting essentially of branched alkyl groups in which the extent of branching increases as the size of said alkyl groups selected increases, the number of molecules containing different alkyl groups increasing in said mixtures as the size of the alkyl groups which contain more than about 10 carbon atoms increases, the $R_1$ groups being attached at tertiary carbon atoms to the nitrogen atoms of said molecules;
(2) the $R_2$ groups of the ester monomer (B) molecules are selected from alkyl groups containing up to and including about 14 carbon atoms, the average number of carbon atoms of the selected alkyl groups being from about 8 to 14, the $R_2$ groups being attached at non-tertiary carbon atoms to the oxygen atoms of said molecules; and 23. A liquid to viscous semi-solid mixture of N-alkyl amides of a mixture of alkyl amines and at least one acid selected from the group consisting of acrylic and methacrylic acids, said amines selected from the group consisting of (1) branched, different alkyl primary amines averaging from about 8 to 24 carbon atoms in the alkyl groups thereof, (2) branched, different alkyl secondary amines in which one of the alkyl groups of each of the secondary amines contains no more than 10 carbon atoms and no more than the number of carbon atoms of the other alkyl group attached to the secondary amino nitrogen atom, and in which the other alkyl groups of each of said secondary amines average from about 8 to 24 carbon atoms, and (3) mixtures of said primary and secondary amines.

24. An adhesive tape comprising a flexible backing and supported thereon a pressure-sensitive adhesive polymer of monomers consisting essentially of:
(A) at least one monomer selected from the group consisting of monomers the molecules of which have the structure

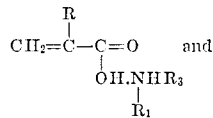

(B) at least one ester monomer selected from the group consisting of monomers the molecules of which have the structure

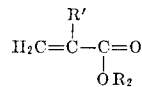

in which monomer molecules:
(1) R and R' are selected from the group consisting of hydrogen and methyl groups;
(2) The $R_1$ groups of the monomer (A) molecules are selected from alkyl groups containing up to and including about 28 carbon atoms, said monomer (A) molecules consisting of a mixture of molecules containing different alkyl groups in which the average number of carbon atoms of the selected alkyl groups is from about 8 to 24, the alkyl groups selected which contain more than about 6 carbon atoms consisting essentially of branched alkyl groups in which the extent of branching increases as the size of said alkyl groups selected increases, the number of molecules containing different alkyl groups increasing in said mixtures as the size of the alkyl groups increases;
(3) the $R_2$ groups of the ester monomer (B) molecules are selected from alkyl groups containing up to and including about 14 carbon atoms, the average number of carbon atoms of the selected alkyl groups being no greater than about 14, at least about 50% of the ester monomer molecules having the $R_2$ groups attached at non-tertiary carbon atoms to the oxygen atom;
(4) the $R_3$ groups of the monomer (A) molecules are selected from the class consisting of hydrogen and alkyl groups containing up to and including about 10 carbon atoms, the alkyl groups selected which contain more than about 6 carbon atoms consisting essentially of branched alkyl groups;
the proportion, by weight, of monomer (A) to ester monomer (B) which is combined in said polymer being within the range of 1:19 to 3:1; but not exceeding a mol ratio of 1:1;
the proportion, the size and extent of branching of said $R_1$, $R_2$, and $R_3$ groups and the extent to which each of said monomers consists of mixtures of different molecules being interdependent.

25. An adhesive tape comprising a flexible backing and supported thereon a pressure-sensitive adhesive polymer of monomers consisting essentially of:
(A) a mixture of amido and amino-salt monomers the molecule of which have the respective structures

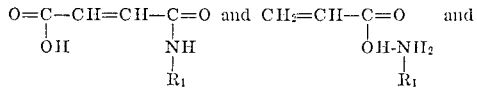

(B) at least one ester monomer selected from the group consisting of monomers the molecules of which have the structure

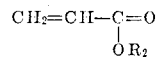

in which monomer molecules:
(1) the $R_1$ groups of the monomer (A) molecules are selected from alkyl groups containing up to and including about 28 carbon atoms, said monomer (A) molecules consisting of a mixture of molecules containing different alkyl groups in which the average number of carbon atoms of the selected alkyl groups is from about 8 to about 24, the alkyl groups selected which contain more than about 6 carbon atoms consisting essentially of branched alkyl groups in which the extent of branching increases as the size of said alkyl groups selected increases, the number of molecules containing different alkyl groups increasing in said mixtures as the size of the alkyl groups increases;
(2) the $R_2$ group of the ester monomer(B) molecules are selected from alkyl groups containing up to and including about 14 carbon atoms, the average number of carbon atoms of the selected alkyl groups being no greater than about 13, the $R_2$ groups being attached at non-tertiary carbon atoms to the oxygen atoms of said molecules; the proportion, by weight, of the monomer(A) mixture to ester Monomer(B) which is combined in said polymer being within the range of 1:19 to 3:1, but not exceeding a mol ratio of 1:1, the proportion, the size and extent of branching of said $R_1$ and $R_2$ groups and the extent to which each of said monomers consists of mixtures of different molecules being interdependent.

26. An adhesive tape comprising a flexible backing and supported thereon a pressure-sensitive adhesive polymer of monomers consisting essentially of:
(A) a mixture of acrylamide and amino-salt monomers the molecules of which have the respective structures

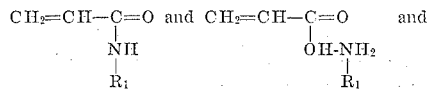

(B) at least one ester monomer selected from the group consisting of monomers the molecules of which have the structure

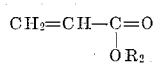

in which monomer molecules:
(1) the $R_1$ groups of the monomer (A) molecules are selected from alkyl groups containing up to and including about 28 carbon atoms, said molecules consisting of a mixture of molecules containing different alkyl groups in which the average number of carbon atoms of the selected alkyl groups is from about 8 to about 24, the alkyl groups selected which contain more than about 6 carbon atoms consisting essentially of branched alkyl groups in which the extent of branching increases as the size of said alkyl groups selected increases, the number of molecules containing different alkyl groups increasing in said mixtures as the size of the alkyl groups increases;
(2) the $R_2$ groups of the ester monomer(B) molecules are selected from alkyl groups containing up to and including about 14 carbon atoms, the average number of carbon atoms of the selected alkyl groups being no greater than about 13, the $R_2$ groups being attached at non-tertiary carbon atoms to the oxygen atoms of said molecules; the proportion, by weight, of the monomer(A) mixture to ester monomer(B) which is combined in said polymer being within the range of 1:19 to 3:1, but not exceeding a mol ratio of 1:1, the proportion, the size and extent of branching of said $R_1$ and $R_2$ groups and the extent to which each of said monomers consists of mixtures of diffferent molecules being interdependent.

27. An adhesive tape comprising a flexible backing and supported thereon a pressure-sensitive adhesive polymer of monomers consisting essentially of:
(A) a mixture of (a) at least one monomer selected from the group consisting of monomers the molecules of which have the structure

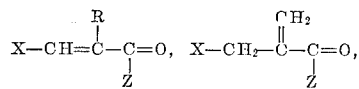

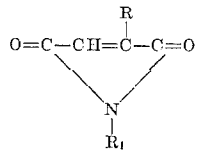

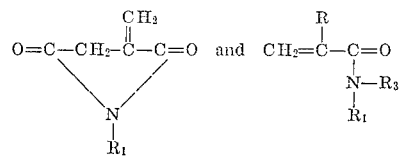

and (b) a mixture of N-alkyl amino-salts of a mixture of alkyl amines and at least one acid selected from the group consisting of acrylic and methacrylic acids, said amines selected from the group consisting of (1) branched, different alkyl primary amines averaging from about 8 to 24 carbon atoms in the alkyl groups thereof, (2) branched, different alkyl secondary amines in which one of the alkyl groups of each of the secondary amines contains no more than 10 carbon atoms and no more than the number of carbon atoms of the other alkyl group attached to the secondary amino nitrogen atom, and in which the other alkyl groups of each of said secondary amines average from about 8 to 24 carbon atoms, and (3) mixtures of said primary and secondary amines; and
(B) at least one ester monomer selected from the group consisting of monomers the molecules of which have the structure

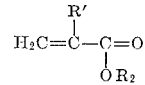

in which monomer molecules:
(1) R and R' are selected from the group consisting of hydrogen and methyl groups;
(2) X is selected from the group consisting of

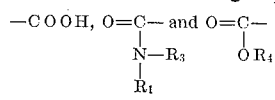

(3) Z is selected from the group consisting of

and —$OR_5$, X being —COOH when Z is $OR_5$;
(4) the $R_1$ groups of the monomer(A) molecules are selected from alkyl groups containing up to and including about 28 carbon atoms, the average number of carbon atoms of the selected alkyl groups being no greater than about 24, the alkyl groups selected which contain more than about 6 carbon atoms consisting essentially of branched alkyl groups in which the extent of branching increases as the size of said alkyl groups selected increases, said molecules consisting of a mixture of molecules containing different alkyl groups when said molecules contain alkyl groups having more than about 10 carbon atoms, the number of molecules containing different alkyl groups increasing in said mixtures as the size of the alkyl groups which contain more than about 10 crabon atoms increases;
(5) the $R_2$ groups of the ester monomer(B) molecules are selected from alkyl groups containing up to and including about 14 carbon atoms, the average number of carbon atoms of the selected alkyl groups being no greater than about 14, at least about 50% of the ester monomer molecules having the $R_2$ groups attached at non-tertiary carbon atoms to the oxygen atom;
(6) the $R_3$ groups of the monomer(A) molecules are selected from the class consisting of hydrogen and alkyl groups containing up to and including about 10 carbon atoms, the alkyl groups selected which contain more than about 6 carbon atoms consisting essentially of branched alkyl groups;

(7) the $R_4$ groups of the monomer(A) molecules are selected from alkyl groups containing up to and including 18 carbon atoms, the alkyl groups selected which contain more than about 8 carbon atoms consisting essentially of branched alkyl groups;

(8) the $R_5$ groups of the monomer(A) molecules are a mixture of alkyl groups selected from alkyl groups containing up to and including about 24 carbon atoms, the average number of carbon atoms of the alkyl groups being from about 8 to 18, the alkyl groups selected which contain more than about 7 carbon atoms consisting of branched alkyl groups in which the extent of branching increases as the size of the alkyl groups increases and in which mixture the number of different alkyl groups selected increases as the size of the alkyl groups increases, at least about 50% of said monomer(A) molecules of this paragraph (8) having the $R_5$ groups attached at non-tertiary carbon atoms to the oxygen atom; the proportion, by weight, of monomer(A) to ester monomer(B) which is combined in said polymer being within the range of 1:19 to 3:1, but not exceeding a mol ratio of 1:1, the proportion, the size and extent of branching of said $R_1$, $R_2$, $R_3$, $R_4$ and $R_5$ groups and the extent to which each of said monomers consists of mixtures of different molecules being interdependent.

28. A pressure-sensitive adhesive tape comprising a flexible backing and supported thereon a pressure-sensitive adhesive comprising a tackifier resin and a polymer consisting essentially of:

(A) at least one half-ester selected from the class consisting of esters of an acid selected from the group consisting of maleic acid, fumaric acid, citraconic and itaconic acid and at least one alcohol selected from alcohols of the group consisting of $C_1$ to $C_7$ alkyl alcohols, at least 50% of the alcohols selected consisting of non-tertiary alkyl alcohols; and (B) at least one ester selected from the class consisting of esters of an acid selected from the group consisting of acrylic and methacrylic acids and at least one alcohol selected from alcohols of the group consisting of $C_1$ to $C_{14}$ alkyl alcohols, at least 50% of the alcohols selected consisting of non-tertiary alkyl alcohols, the average number of carbon atoms of the alkyl groups of the selected alcohols being no greater than 14;

the proportion, by weight, of half-ester monomer(A) to ester monomer(B) which is combined in said polymer being within the range of 1:19 to 7:3 but not exceeding a mol ratio of 1:1;

said tackifier resin being present in an amount of at least about 5 parts per 100 parts of said polymer.

29. A pressure-sensitive adhesive tape in accordance with claim 2 wherein said polymer is mixed with at least about 5 parts of a tackifier resin per 100 parts of said polymer.

30. An adhesive tape in accordance with claim 9 wherein:

the monomer (A) molecules combined in said polymer consist of molecules having $R_1$ groups containing no more than 10 carbon atoms, the average number of carbon atoms of the $R_1$ alkyl groups of said molecules being no greater than about 6;

the ester monomer (B) molecules combined in said polymer consist of molecules in which the average number of carbon atoms of the $R_2$ groups thereof is from about 3 to 13; and the proportion, by weight, of monomer (A) to ester monomer (B) is within the range of 1:19 to 1:2.

31. An adhesive tape in accordance with claim 9 wherein:

the monomer (A) molecules combined in said polymer consist of molecules having $R_1$ groups containing no more than 10 carbon atoms, the average number of carbon atoms of the $R_1$ alkyl groups of said molecules being from about 7 to 10;

the ester monomer (B) molecules combined in said polymer consist of molecules in which the average number of carbon atoms of the $R_2$ alkyl groups thereof is from about 2 to 13; and the proportion, by weight, of monomer (A) to ester monomer (B) is within the range of 1:19 to 2:3.

32. An adhesive tape comprising a backing and a pressure-sensitive adhesive polymer in accordance with claim 8 wherein:

the monomer (A) molecules consist of a mixture of molecules containing different alkyl groups in which the average number of carbon atoms of the $R_1$ alkyl groups is from about 8 to 24.

33. An adhesive tape comprising a backing and a pressure-sensitive adhesive polymer in accordance with claim 7 wherein the molecules of the (A) monomer are itaconamic acids wherein X of the structural formula is OH and $R_3$ is hydrogen.

34. An adhesive tape comprising a backing and a pressure-sensitive adhesive polymer in accordance with claim 11 wherein said monomer (A) combined in said polymer consists of a mixture of said molecules containing different $R_1$ alkyl groups, the average number of carbon atoms of said $R_1$ alkyl groups being from about 11 to 14.

35. A pressure-sensitive adhesive polymer in accordance with claim 15 wherein:

the $R_1$ alkyl groups are tertiary alkyl groups attached at tertiary carbon atoms thereof to the nitrogen atoms of the monomer (A) molecules; and the ester monomer (B) molecules are acrylate esters in which the R' groups are hydrogen.

36. A pressure-sensitive adhesive polymer in accordance with claim 35 wherein the monomer (A) molecules are amic acids having the formula in which X is —OH.

37. A pressure-sensitive adhesive polymer in accordance with claim 15 wherein:

the $R_1$ alkyl groups are tertiary alkyl groups attached at tertiary carbon atoms thereof to the nitrogen atoms of the monomer (A) molecules;

the ester monomer (B) molecules are methacrylate esters in which the R' groups are methyl and the $R_2$ alkyl groups thereof average not less than about 4 carbon atoms; and the proportion, by weight, of monomer (A) to ester monomer (B) is within the range of 1:19 to 3:2, but not exceeding a mol ratio of 1:2.

38. A pressure-sensitive adhesive polymer of monomers consisting essentially of:

(A) at least one amide monomer selected from the group consisting of monomers the molecules of which have the structure

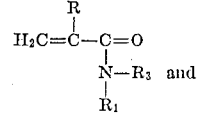

(B) at least one ester monomer selected from the group consisting of monomers the molecules of which have the structure

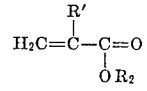

in which monomer molecules:

(1) R and R' are selected from the class consisting of hydrogen and methyl groups;

(2) the $R_1$ groups of the amide monomer (A) molecules are selected from alkyl groups containing up to and including about 28 carbon atoms, said monomer (A) molecules consisting of a mixture of molecules containing different alkyl groups in which the average number of carbon atoms of the selected alkyl groups is from about 8 to about 24, the alkyl groups selected which contain more than about 6 carbon atoms consisting essentially of branched alkyl groups in which the extent of branching increases as the size of the alkyl groups increases, the number of molecules containing different alkyl groups increasing in said mixtures as the size of the alkyl groups increases;

(3) the $R_2$ groups of the ester monomer (B) molecules are selected from alkyl groups containing up to and including about 14 carbon atoms, the average number of carbon atoms of the selected alkyl groups being no greater than about 13, at least about 50% of the ester monomer molecules having the $R_2$ groups attached at non-tertiary carbon atoms to the oxygen atoms of said molecules;

(4) the $R_3$ groups of the amide monomers (A) molecules are selected from the class consisting of hydrogen and alkyl groups containing up to and including about 10 carbon atoms, the alkyl groups selected which contain more than about 6 carbon atoms consisting essentially of branched alkyl groups;

the proportion, by weight, of amide monomer (A) to ester monomer (B) which is combined in said polymer being within the range of 1:19 to 3:1, but not exceeding a mol ratio of 1:1, the proportion, the size and extent of branching of said $R_1$, $R_2$ and $R_3$ groups and the extent to which each of the monomers consist of mixtures of different molecules being interdependent.

39. A pressure-sensitive adhesive polymer in accordance with claim 38 wherein:

the $R_1$ alkyl groups are tertiary alkyl groups attached at tertiary carbon atoms thereof to the nitrogen atoms of the monomer (A) molecules; and the ester monomer (B) molecules are acrylate esters in which the R' groups are hydrogen and the $R_2$ alkyl groups thereof average from about 3 to 13 carbon atoms.

40. An adhesive tape comprising a backing and a pressure-sensitive adhesive polymer in accordance with claim 4 wherein the (A) mixture of half-esters consists of half-esters of maleic acid.

41. An adhesive tape comprising a backing and a pressure-sensitive adhesive polymer in accordance with claim 4 wherein the (A) mixture of half-esters consists of a mixture of half-esters of at least one of said acids and isooctyl oxo alcohol consisting essentially of a mixture of dimethylhexanols and monomethylheptanols.

42. An adhesive tape comprising a backing and a pressure-sensitive adhesive polymer in accordance with claim 4 wherein the (A) mixture of half-esters consists of a mixture of half-esters of at least one of said acids and tridecyl oxo alcohol consisting essentially of tetramethylnonanols.

43. An adhesive tape comprising a backing and a pressure-sensitive adhesive polymer in accordance with claim 4 wherein the (A) mixture of half-esters consists of half-esters of itaconic acid.

44. An adhesive tape comprising a flexible backing and a pressure-sensitive adhesive polymer in accordance with claim 14 wherein said monomer (C) is a monomer having more than one ethylenic grouping, said monomer (C) being present in said polymer in an amount up to about 10% by weight of the polymer.

45. An adhesive tape comprising a flexible backing and a pressure-sensitive adhesive polymer in accordance with claim 14 wherein said monomer (C) contains a polar group.

References Cited by the Examiner

UNITED STATES PATENTS

| | | | |
|---|---|---|---|
| 2,289,540 | 7/1942 | Dittmar et al. | 260—86.1 |
| 2,311,548 | 2/1943 | Jacobson et al. | 267—86.1 |
| 2,342,295 | 2/1944 | Orthner et al. | 260—78 |
| 2,533,204 | 12/1950 | Caldwell | 260—78 |
| 2,698,316 | 12/1954 | Giammaria | 260—78 |
| 2,892,821 | 6/1959 | Stewart et al. | 260—77 |
| 2,963,452 | 12/1960 | Sinn et al. | 260—78.5 |
| 2,967,162 | 1/1961 | Vasta | 260—78.5 |
| 2,976,203 | 3/1961 | Young et al. | 260—78.5 |
| 3,028,259 | 4/1962 | Webber | 260—78 |
| 3,055,873 | 9/1962 | Hull et al. | 260—78.5 |
| 3,112,296 | 11/1963 | Maeder | 260—86.1 |
| 3,189,581 | 6/1965 | Hart et al. | 260—86.1 |

WILLIAM H. SHORT, *Primary Examiner.*

H. D. ANDERSON, *Assistant Examiner.*